United States Patent
Nguyen et al.

(10) Patent No.: US 8,521,611 B2
(45) Date of Patent: Aug. 27, 2013

(54) ARTICLE TRADING AMONG MEMBERS OF A COMMUNITY

(75) Inventors: Vu Nguyen, Hillsborough, CA (US); Anselm P. Baird-Smith, San Jose, CA (US); William A. Alvarado, Menlo Park, CA (US); John P. Cogan, Houston, TX (US); Carole K. Alvarado, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 1316 days.

(21) Appl. No.: 11/682,635

(22) Filed: Mar. 6, 2007

(65) Prior Publication Data
US 2007/0244768 A1    Oct. 18, 2007

Related U.S. Application Data

(60) Provisional application No. 60/779,759, filed on Mar. 6, 2006.

(51) Int. Cl.
*G06Q 30/00* (2012.01)

(52) U.S. Cl.
USPC .......................... 705/26.4; 705/26.35; 705/37

(58) Field of Classification Search
USPC .................................. 705/4, 37, 41, 26–27.2
See application file for complete search history.

(56) References Cited

U.S. PATENT DOCUMENTS

| | | | |
|---|---|---|---|
| 4,996,642 A | 2/1991 | Hey | |
| 5,355,302 A | 10/1994 | Martin | |

(Continued)

FOREIGN PATENT DOCUMENTS

| | | |
|---|---|---|
| EP | 1050833 | 8/2000 |
| EP | 1231788 | 8/2002 |

(Continued)

OTHER PUBLICATIONS

"International Search Report" and "Written Opinion of the International Searching Authority" for PCT/US07/63392, mail date: Feb. 26, 2008 (10 pages total).

(Continued)

*Primary Examiner* — Adam Levine
(74) *Attorney, Agent, or Firm* — Novak Druce Connolly Bove + Quigg LLP

(57) ABSTRACT

Articles such as compact discs or electronic files are traded among a plurality of members who are registered in a common community. Each member has an account including a trading credit balance and a mailing address. A user interface is provided that allows a member to enter articles that the member owns and is willing to trade and articles that the member wants to own. The user interface also receives article trading instruction messages. An administration computer hosts the plurality of members and facilitates article trades among the members. The administration computer identifies matches between owned and wanted articles. A priority algorithm is used to select the member who will receive the article if there is more than one member who wants an article that another member owns and is willing to trade. The priority algorithm is based in part on a member score that is a function of the relative value of the articles that a member owns and sends to another member compared to the relative value of the articles that the member wants and receives from another member, the relative value of the articles being determined by a demand for the article compared to a supply for the article among the members.

33 Claims, 36 Drawing Sheets

(56) References Cited

U.S. PATENT DOCUMENTS

| | | |
|---|---|---|
| 5,375,235 A | 12/1994 | Berry et al. |
| 5,464,946 A | 11/1995 | Lewis |
| 5,483,278 A | 1/1996 | Strubbe |
| 5,583,763 A | 12/1996 | Atcheson et al. |
| 5,724,521 A | 3/1998 | Dedrick |
| 5,754,939 A | 5/1998 | Herz |
| 5,758,257 A | 5/1998 | Herz |
| 5,765,144 A | 6/1998 | Larche |
| 5,890,152 A | 3/1999 | Rapaport |
| 5,918,014 A | 6/1999 | Robinson |
| 5,950,176 A | 9/1999 | Keiser |
| 6,000,044 A | 12/1999 | Chrysos et al. |
| 6,041,311 A | 3/2000 | Chislenko et al. |
| 6,047,311 A | 4/2000 | Ueno et al. |
| 6,112,186 A | 8/2000 | Bergh et al. |
| 6,134,532 A | 10/2000 | Lazarus et al. |
| 6,345,288 B1 | 2/2002 | Reed |
| 6,346,951 B1 | 2/2002 | Mastronardi |
| 6,347,313 B1 | 2/2002 | Ma |
| 6,349,339 B1 | 2/2002 | Williams |
| 6,381,575 B1 | 4/2002 | Martin et al. |
| 6,430,539 B1 | 8/2002 | Lazarus et al. |
| 6,434,621 B1 | 8/2002 | Pezzillo |
| 6,438,579 B1 | 8/2002 | Hosken |
| 6,487,539 B1 | 11/2002 | Aggarwal et al. |
| 6,526,411 B1 | 2/2003 | Ward |
| 6,532,469 B1 | 3/2003 | Feldman et al. |
| 6,577,716 B1 | 6/2003 | Minter |
| 6,587,127 B1 | 7/2003 | Leeke et al. |
| 6,615,208 B1 | 9/2003 | Behrens et al. |
| 6,647,371 B2 | 11/2003 | Shinohara |
| 6,687,696 B2 | 2/2004 | Hofmann et al. |
| 6,690,918 B2 | 2/2004 | Evans et al. |
| 6,704,576 B1 | 3/2004 | Brachman et al. |
| 6,727,914 B1 | 4/2004 | Gutta |
| 6,748,395 B1 | 6/2004 | Picker et al. |
| 6,751,574 B2 | 6/2004 | Shinohara |
| 6,785,688 B2 | 8/2004 | Abajian et al. |
| 6,842,761 B2 | 1/2005 | Diamond et al. |
| 6,850,252 B1 | 2/2005 | Hoffberg |
| 6,914,891 B2 | 7/2005 | Ha et al. |
| 6,931,454 B2 | 8/2005 | Deshpande et al. |
| 6,933,433 B1 | 8/2005 | Porteus |
| 6,941,324 B2 | 9/2005 | Plastina |
| 6,947,922 B1 | 9/2005 | Glance |
| 6,950,804 B2 | 9/2005 | Strietzel |
| 6,987,221 B2 | 1/2006 | Platt |
| 6,990,497 B2 | 1/2006 | O'Rourke et al. |
| 6,993,532 B1 | 1/2006 | Platt et al. |
| 7,013,238 B1 | 3/2006 | Weare |
| 7,020,637 B2 | 3/2006 | Bratton |
| 7,021,836 B2 | 4/2006 | Anderson |
| 7,043,479 B2 | 5/2006 | Ireton |
| 7,051,352 B1 | 5/2006 | Schaffer |
| 7,072,846 B1 | 7/2006 | Robinson |
| 7,082,407 B1 | 7/2006 | Bezos et al. |
| 7,096,234 B2 | 8/2006 | Plastina |
| 7,111,240 B2 | 9/2006 | Crow |
| 7,113,917 B2 | 9/2006 | Jacobi |
| 7,113,999 B2 | 9/2006 | Pestoni et al. |
| 7,120,619 B2 | 10/2006 | Drucker |
| 7,127,143 B2 | 10/2006 | Elkins, II et al. |
| 7,136,866 B2 | 11/2006 | Springer, Jr. |
| 7,139,723 B2 | 11/2006 | Conkwright |
| 7,174,126 B2 | 2/2007 | McElhatten |
| 7,180,473 B2 | 2/2007 | Horie |
| 7,194,421 B2 | 3/2007 | Conkwright |
| 7,196,258 B2 | 3/2007 | Platt |
| 7,197,472 B2 | 3/2007 | Conkwright |
| 7,224,282 B2 | 5/2007 | Terauchi et al. |
| 7,236,941 B2 | 6/2007 | Conkwright |
| 7,246,041 B2 | 7/2007 | Fukuda |
| 7,256,341 B2 | 8/2007 | Plastina |
| 7,277,870 B2 | 10/2007 | Mourad et al. |
| 7,302,419 B2 | 11/2007 | Conkwright |
| 7,302,468 B2 | 11/2007 | Wijeratne |
| 7,358,434 B2 | 4/2008 | Plastina |
| 7,363,314 B2 | 4/2008 | Picker et al. |
| 7,392,212 B2 | 6/2008 | Hancock |
| 7,403,769 B2 | 7/2008 | Kopra |
| 7,415,181 B2 | 8/2008 | Greenwood |
| 7,434,247 B2 | 10/2008 | Dudkiewicz et al. |
| 7,457,852 B2 | 11/2008 | O'Rourke et al. |
| 7,457,862 B2 | 11/2008 | Hepworth et al. |
| 7,478,323 B2 | 1/2009 | Dowdy |
| 7,487,107 B2 | 2/2009 | Blanchard et al. |
| 7,490,775 B2 | 2/2009 | Biderman |
| 7,493,572 B2 | 2/2009 | Card et al. |
| 7,499,630 B2 | 3/2009 | Koch et al. |
| 7,505,959 B2 | 3/2009 | Kaiser et al. |
| 7,546,254 B2 | 6/2009 | Bednarek |
| 7,568,213 B2 | 7/2009 | Carhart et al. |
| 7,571,121 B2 | 8/2009 | Bezos |
| 7,571,183 B2 | 8/2009 | Renshaw et al. |
| 7,574,422 B2 | 8/2009 | Guan et al. |
| 7,574,513 B2 | 8/2009 | Dunning et al. |
| 7,580,932 B2 | 8/2009 | Plastina et al. |
| 7,599,847 B2 | 10/2009 | Block |
| 7,599,906 B2 | 10/2009 | Kashiwagi |
| 7,599,950 B2 | 10/2009 | Walther et al. |
| 7,644,077 B2 | 1/2010 | Picker et al. |
| 7,647,613 B2 | 1/2010 | Drakoulis |
| 7,650,570 B2 | 1/2010 | Torrens et al. |
| 7,657,224 B2 | 2/2010 | Goldberg et al. |
| 7,657,493 B2 | 2/2010 | Meijer |
| 7,680,849 B2 | 3/2010 | Heller |
| 7,680,959 B2 | 3/2010 | Svendsen |
| 7,693,887 B2 | 4/2010 | McLaughlin |
| 7,707,603 B2 | 4/2010 | Abanami |
| 7,720,871 B2 | 5/2010 | Rogers et al. |
| 7,725,494 B2 | 5/2010 | Rogers et al. |
| 7,734,569 B2 | 6/2010 | Martin |
| 7,743,009 B2 | 6/2010 | Hangartner |
| 7,797,321 B2 | 9/2010 | Martin |
| 7,826,444 B2 | 11/2010 | Irvin |
| 7,831,199 B2 | 11/2010 | Ng |
| 7,840,570 B2 | 11/2010 | Cervera et al. |
| 7,853,712 B2 | 12/2010 | Amidon et al. |
| 7,875,788 B2 | 1/2011 | Benyamin |
| 7,889,724 B2 | 2/2011 | Irvin |
| 2001/0007099 A1 | 7/2001 | Rau |
| 2001/0021914 A1 | 9/2001 | Jacobi et al. |
| 2001/0056434 A1 | 12/2001 | Kaplan et al. |
| 2002/0002899 A1 | 1/2002 | Gjerdingen |
| 2002/0004759 A1 | 1/2002 | Bradford et al. |
| 2002/0042912 A1 | 4/2002 | Iijima et al. |
| 2002/0059094 A1 | 5/2002 | Hosea et al. |
| 2002/0082901 A1 | 6/2002 | Dunning et al. |
| 2002/0152117 A1 | 10/2002 | Cristofalo et al. |
| 2002/0178223 A1 | 11/2002 | Bushkin |
| 2002/0178276 A1 | 11/2002 | McCartney et al. |
| 2002/0194215 A1 | 12/2002 | Cantrell et al. |
| 2003/0014351 A1 | 1/2003 | Neff et al. |
| 2003/0022953 A1 | 1/2003 | Zampini et al. |
| 2003/0033321 A1 | 2/2003 | Schrempp et al. |
| 2003/0055689 A1 | 3/2003 | Block |
| 2003/0097379 A1 | 5/2003 | Ireton |
| 2003/0120630 A1 | 6/2003 | Tunkelang |
| 2003/0163392 A1* | 8/2003 | Banerjee et al. ................ 705/27 |
| 2003/0182254 A1 | 9/2003 | Plastina et al. |
| 2003/0212710 A1 | 11/2003 | Guy |
| 2003/0229537 A1 | 12/2003 | Dunning et al. |
| 2004/0002993 A1 | 1/2004 | Toussaint et al. |
| 2004/0003392 A1 | 1/2004 | Trajkovic et al. |
| 2004/0068552 A1 | 4/2004 | Kotz et al. |
| 2004/0070538 A1 | 4/2004 | Horie et al. |
| 2004/0073924 A1 | 4/2004 | Pendakur |
| 2004/0107140 A1 | 6/2004 | Postrel |
| 2004/0128286 A1 | 7/2004 | Yasushi et al. |
| 2004/0139064 A1 | 7/2004 | Chevallier et al. |
| 2004/0148424 A1 | 7/2004 | Berkson et al. |
| 2004/0158860 A1 | 8/2004 | Crow |
| 2004/0162738 A1 | 8/2004 | Sanders et al. |
| 2004/0194128 A1 | 9/2004 | McIntyre |

| | | |
|---|---|---|
| 2004/0215657 A1 | 10/2004 | Drucker et al. |
| 2004/0263337 A1 | 12/2004 | Terauchi et al. |
| 2004/0267715 A1 | 12/2004 | Polson et al. |
| 2005/0005246 A1 | 1/2005 | Card et al. |
| 2005/0021470 A1 | 1/2005 | Martin et al. |
| 2005/0050079 A1 | 3/2005 | Plastina et al. |
| 2005/0060350 A1 | 3/2005 | Baum et al. |
| 2005/0075908 A1 | 4/2005 | Stevens |
| 2005/0091146 A1 | 4/2005 | Levinson |
| 2005/0102610 A1 | 5/2005 | Jie |
| 2005/0114357 A1 | 5/2005 | Chengalvarayan et al. |
| 2005/0131752 A1 | 6/2005 | Gracie |
| 2005/0141709 A1 | 6/2005 | Bratton |
| 2005/0154608 A1 | 7/2005 | Paulson et al. |
| 2005/0160458 A1 | 7/2005 | Baumgartner |
| 2005/0193014 A1 | 9/2005 | Prince |
| 2005/0193054 A1 | 9/2005 | Wilson et al. |
| 2005/0195696 A1 | 9/2005 | Rekimoto |
| 2005/0198075 A1 | 9/2005 | Plastina et al. |
| 2005/0203807 A1 | 9/2005 | Bezos et al. |
| 2005/0210009 A1 | 9/2005 | Tran |
| 2005/0210101 A1 | 9/2005 | Janik |
| 2005/0216855 A1 | 9/2005 | Kopra et al. |
| 2005/0216859 A1 | 9/2005 | Paek et al. |
| 2005/0222989 A1 | 10/2005 | Haveliwala et al. |
| 2005/0223039 A1 | 10/2005 | Kim et al. |
| 2005/0234891 A1 | 10/2005 | Walther et al. |
| 2005/0235811 A1 | 10/2005 | Dukane |
| 2005/0251440 A1 | 11/2005 | Bednarek |
| 2005/0256867 A1 | 11/2005 | Walther et al. |
| 2005/0276570 A1 | 12/2005 | Reed et al. |
| 2006/0015571 A1 | 1/2006 | Fukuda et al. |
| 2006/0015904 A1 | 1/2006 | Marcus |
| 2006/0018208 A1 | 1/2006 | Nathan et al. |
| 2006/0018209 A1 | 1/2006 | Drakoulis et al. |
| 2006/0020062 A1 | 1/2006 | Bloom |
| 2006/0020662 A1 | 1/2006 | Robinson |
| 2006/0026263 A1 | 2/2006 | Raghavan et al. |
| 2006/0032363 A1 | 2/2006 | Platt |
| 2006/0053077 A1 | 3/2006 | Mourad |
| 2006/0062094 A1 | 3/2006 | Nathan et al. |
| 2006/0067296 A1 | 3/2006 | Bershad |
| 2006/0074750 A1 | 4/2006 | Clark et al. |
| 2006/0080251 A1 | 4/2006 | Fried |
| 2006/0080356 A1 | 4/2006 | Burges et al. |
| 2006/0091203 A1 | 5/2006 | Bakker et al. |
| 2006/0095516 A1 | 5/2006 | Wijeratne |
| 2006/0100978 A1 | 5/2006 | Heller |
| 2006/0112098 A1 | 5/2006 | Renshaw et al. |
| 2006/0123052 A1 | 6/2006 | Robbin et al. |
| 2006/0136344 A1 | 6/2006 | Jones et al. |
| 2006/0143236 A1 | 6/2006 | Wu |
| 2006/0165571 A1 | 7/2006 | Seon et al. |
| 2006/0168616 A1 | 7/2006 | Candelore |
| 2006/0173910 A1 | 8/2006 | McLaughlin |
| 2006/0173916 A1 | 8/2006 | Verbeck Sibley et al. |
| 2006/0174008 A1 | 8/2006 | Abanami |
| 2006/0195462 A1 | 8/2006 | Rogers |
| 2006/0195512 A1 | 8/2006 | Rogers et al. |
| 2006/0195513 A1 | 8/2006 | Rogers et al. |
| 2006/0195514 A1 | 8/2006 | Rogers et al. |
| 2006/0195515 A1 | 8/2006 | Beaupre et al. |
| 2006/0195516 A1 | 8/2006 | Beaupre |
| 2006/0195521 A1 | 8/2006 | New et al. |
| 2006/0195581 A1 | 8/2006 | Beaupre |
| 2006/0195789 A1 | 8/2006 | Rogers |
| 2006/0195790 A1 | 8/2006 | Beaupre |
| 2006/0206478 A1 | 9/2006 | Glaser |
| 2006/0253874 A1 | 11/2006 | Stark et al. |
| 2006/0265421 A1 | 11/2006 | Ranasinghe et al. |
| 2006/0277098 A1 | 12/2006 | Chung et al. |
| 2006/0282304 A1 | 12/2006 | Bedard et al. |
| 2006/0282311 A1 | 12/2006 | Jiang |
| 2006/0288044 A1 | 12/2006 | Kashiwagi et al. |
| 2006/0288367 A1 | 12/2006 | Swix et al. |
| 2007/0016507 A1 | 1/2007 | Tzara |
| 2007/0043651 A1* | 2/2007 | Xiao et al. .............. 705/37 |
| 2007/0043829 A1 | 2/2007 | Dua |
| 2007/0073596 A1 | 3/2007 | Alexander et al. |
| 2007/0100690 A1 | 5/2007 | Hopkins |
| 2007/0101373 A1 | 5/2007 | Bodlanender et al. |
| 2007/0118546 A1 | 5/2007 | Acharya |
| 2007/0136264 A1 | 6/2007 | Tran |
| 2007/0156677 A1 | 7/2007 | Szabo |
| 2007/0156732 A1 | 7/2007 | Surendran et al. |
| 2007/0161402 A1 | 7/2007 | Ng |
| 2007/0162546 A1 | 7/2007 | McLaughlin |
| 2007/0203790 A1 | 8/2007 | Torrens et al. |
| 2007/0244880 A1 | 10/2007 | Martin et al. |
| 2007/0250429 A1 | 10/2007 | Walser |
| 2007/0250761 A1 | 10/2007 | Bradley et al. |
| 2007/0265979 A1 | 11/2007 | Hangartner |
| 2007/0271286 A1 | 11/2007 | Purang |
| 2007/0271287 A1 | 11/2007 | Acharya et al. |
| 2007/0294096 A1 | 12/2007 | Randall |
| 2008/0004948 A1 | 1/2008 | Flake |
| 2008/0004990 A1 | 1/2008 | Flake |
| 2008/0021851 A1 | 1/2008 | Alcalde |
| 2008/0027881 A1 | 1/2008 | Bisse |
| 2008/0040326 A1 | 2/2008 | Chang et al. |
| 2008/0046317 A1 | 2/2008 | Christianson |
| 2008/0065659 A1 | 3/2008 | Watanabe et al. |
| 2008/0077264 A1 | 3/2008 | Irvin et al. |
| 2008/0082467 A1 | 4/2008 | Meijer et al. |
| 2008/0109378 A1 | 5/2008 | Papadimitriou |
| 2008/0120339 A1 | 5/2008 | Guan et al. |
| 2008/0133601 A1 | 6/2008 | Cervera et al. |
| 2008/0154942 A1 | 6/2008 | Tsai et al. |
| 2008/0155057 A1 | 6/2008 | Khedouri et al. |
| 2008/0155588 A1 | 6/2008 | Roberts et al. |
| 2008/0195438 A1 | 8/2008 | Manfredi |
| 2008/0215173 A1 | 9/2008 | Hicken |
| 2008/0220855 A1 | 9/2008 | Chen et al. |
| 2008/0256106 A1 | 10/2008 | Whitman |
| 2008/0270221 A1 | 10/2008 | Clemens et al. |
| 2009/0006353 A1 | 1/2009 | Vignoli |
| 2009/0024504 A1 | 1/2009 | Lerman et al. |
| 2009/0024510 A1 | 1/2009 | Chen et al. |
| 2009/0048957 A1 | 2/2009 | Celano |
| 2009/0070267 A9 | 3/2009 | Hangartner |
| 2009/0073174 A1 | 3/2009 | Berg et al. |
| 2009/0076939 A1 | 3/2009 | Berg et al. |
| 2009/0076974 A1 | 3/2009 | Berg et al. |
| 2009/0083307 A1 | 3/2009 | Cervera et al. |
| 2009/0089222 A1 | 4/2009 | Ferreira De Castro et al. |
| 2009/0106085 A1 | 4/2009 | Raimbeault |
| 2009/0164641 A1 | 6/2009 | Rogers |
| 2009/0210415 A1 | 8/2009 | Martin et al. |
| 2009/0276368 A1 | 11/2009 | Martin et al. |
| 2010/0161595 A1 | 6/2010 | Martin et al. |
| 2010/0169328 A1 | 7/2010 | Hangartner |
| 2011/0119127 A1 | 5/2011 | Hangartner |

FOREIGN PATENT DOCUMENTS

| | | |
|---|---|---|
| EP | 1420388 | 5/2004 |
| EP | 1548741 | 6/2005 |
| JP | 11052965 | 2/1999 |
| JP | 2002108351 | 4/2002 |
| JP | 2003255958 | 9/2003 |
| JP | 2004221999 | 8/2004 |
| JP | 2005027337 | 1/2005 |
| KR | 2002025579 | 4/2002 |
| WO | 03036541 | 5/2003 |
| WO | 03051051 | 6/2003 |
| WO | 2004070538 | 8/2004 |
| WO | 2005013114 | 2/2005 |
| WO | 2005115107 | 12/2005 |
| WO | 2006052837 | 5/2006 |
| WO | 2006075032 | 7/2006 |
| WO | 2006114451 | 11/2006 |
| WO | 2007038806 | 4/2007 |
| WO | 2007075622 | 7/2007 |
| WO | 2007092053 | 8/2007 |
| WO | 2007134193 | 11/2007 |
| WO | 2009149046 | 12/2009 |

OTHER PUBLICATIONS

International Preliminary Report on Patentability for PCT/US2007/063392, date of mailing: Sep. 18, 2008, 8 pages.
Canada—Examiner's Report for App. No. 2713507 mailed on Sep. 21, 2011 (3 pages).
IEEE, no matched results, Nov. 11, 2009, (1 page).
Industry Standard, The, Help FAQs for Standard Prediction Market, http://www.thestandard.com/help, downloaded Jun. 29, 2009.
PCT/ES2005/000213 International Preliminary Report on Patentability (Ch II) Report Dated Nov. 15, 2007, (10 pages).
PCT International Search Report and Written Opinion dated May 28, 2008, PCT Application No. PCT/US2006/003795.
UK Search Examination Report, App. No. GB1014954.0, mailed Dec. 16, 2010.
PCT International Written Opinion dated Aug. 10, 2008, PCT Application No. PCT/US2006/034218 (5 pages).
www.akoo.com/Akoo/, Web Page, Akoo, Pick the Music, Waiting in the line at the Theme Park, Introducing the m-Venue™ platform, webpage printed out on Sep. 7, 2006.
www.ecastinc.com/music_licensing.html, Web Page, Ecast Network, interactive entertainment network, Music/ Licensing, webpage printed out on Sep. 7, 2006.
www.roweinternational.com/jukeboxes_dia.html, Web Page, Digital Internet Access Jukeboxes, Rowe International, webpage printed out on Sep. 7, 2006.
www.touchtunes.com, Web Page, Toughtunes, Turn you ROWE 100A's and 100B's into touch tunes Digital Jukeboxes—BOSE, webpage printed out on Sep. 7, 2006.
PCT International Search Report dated Feb. 9, 2007, PCT Application No. PCT/US2006/034218, 2pp.
PCT International Search Report dated Mar. 25, 2008, PCT Application No. PCT/US2006/38769, 2 pp.
PCT/US2006/048330; International Bureau; PCT Search Report and Written Opinion; Mar. 20, 2008, (10 pages).
"Communications of the ACM" Dec. 1992, vol. 35, No. 12 at pp. 26-28 (Introduction to special issue regarding Workshop on High Performance Information Filtering, Morristown, N.J. Nov. 1991).
"Apple: iTunes 4.2 User Guide for Windows"; Dec. 2003; retrieved from the internet: URL: http://www2.austin.cc.tx.us/tcm/projects/itunes.pdf; pp. 17-19. (Added Ref Nov. 5, 2009).
"Architecting Personalized Delivery of Multimedia Information", Communications of the ACM (Dec. 1992).
"Communication from the Examining Division dated Jul. 22, 2011", European Patent Application No. 09169573.4 (8 pages).
"Digital Music Sales Triple to $1.1 Billion in 2005", Maintenance Fees, Feb. 24, 2006, Axcessnews.com, available online www.axcessnews.com/modules/wfsection/article.php?articleid=8327, last viewed Feb. 24, 2006.
"Final Office Action dated Jan. 1, 2012", U.S. Appl. No. 12/242,728 (15 pages).
"Final Office Action dated Nov. 10, 2011", U.S. Appl. No. 12/242,768 (10 pages).
"Lessons from LyricTimeTM: A Prototype Multimedia System", 4th IEEE ComSoc International Workshop on Multimedia Communications (Apr. 1992).
"New Music Recommendation System is Based on FOAF Personal Profiling", www.masternewmedia.org/music_recommendation/music_recommendation_system_FOAF, Oct. 1, 2005.
"Non-Final Office Action dated Feb. 16, 2012", U.S. Appl. No. 12/242,758 (24 pages).
"Non-Final Office Action dated Feb. 9, 2012", U.S. Appl. No. 12/646,916 (13 pages).
"Non-Final Office Action dated Jan. 9, 2012", U.S. Appl. No. 12/242,735 (12 pages).
"Not Your Average Jukebox", www.alwayson-network.com/comments.php?id=P12663 0 37 0 C, Web Page, Not Your Average Jukebox, on Hollywood 1000 contender Ecast uses broadbank to being the digital media experience to your watering hole. Posted Nov. 4, 2005.
"PCT International Preliminary Report on Patentability (Ch II) dated May 22, 2007", PCT Application No. PCT/ES2005/00003.
"PCT International Preliminary Report on Patentability (Ch. II) dated Nov. 15, 2007", PCT Application No. PCT/US2005/000213.
"PCT International Search Report and Written Opinion dated Jul. 15, 2009", PCT Application No. PCT/US2009/45911.
"PCT International Search Report and Written Opinion dated Jun. 5, 2009", PCT Application No. PCT/US09/42002.
"PCT International Search Report dated Oct. 23, 2009", PCT Application No. PCT/US2006/004257.
"PCT International Search Report and Written Opinion dated Dec. 7, 2012", PCT Application No. PCT/US2007/068708 (6 pages).
"PCT International Search Report dated Jul. 15, 2009", PCT Application No. PCT/US2009/45725.
"PCT International Search Report Dated Sep. 4, 2009", PCT Application No. PCT/US2009/051233.
"PCT Written Opinion of the International Preliminary Examining Authority dated Mar. 19, 2007", PCT Application No. PCT/ES2005/00003.
"PCT Written Opinion of the International Searching Authority dated Jan. 12, 2006", PCT Application No. PCT/ES2005/000213.
"PCT Written Opinion of the International Searching Authority Report dated Jun. 10, 2005", PCT Application No. PCT/ES2005/00003.
"RFID Brings Messages to Seattle Sidewalks", www.rfidjournal.comfarticle/articleview/1619/1/1, Web Page, RFID brings messages to Seattle side walks on RFID system being deployed next week will send marketing and assistive information to users carrying active RFID tags. RFID Journal (pp. 1-4), May 26, 2004.
"Social Networking Meets Music Listening: Mecora Launches Radio 2.0", www.masternewmedia.org/news/2006/04/13/social_networking_meets_music_listening.htm, Apr. 13, 2006.
www.bmi.com/news/200403/20040324b.asp, Web Page, BMI™ Figures Don't Lie, Mar. 24, 2004, Touch Tunes Signs License Agreement for BMI Music in Digital Jukeboxes.
Treemap, University of Maryland, http://www.cs.umd.edu/hcil/treemap/, last udpated Aug. 5, 2003, (4 pages).
The Trustees of Indiana University, Variations 2, The Indiana University Digital Music Library, http://dml.indiana.edu/, last updated May 11, 2005 (1 page).
Alvear, Jose, "Risk-Free Trial Streaming Media Delivery Tools," Streaming Media.com; www.streamingmedia.com/ article.ap?id=5768, Jun. 30, 2000.
Baluja, S. et al., "Video Suggestion and Discovery for YouTube: Taking Random Walks through the View Graph", in WWW '08, 2008, pp. 895-904.
Belkins, et al., "Information Filtering and Information Retrieval: Two Sides of the Same Coin?", Communications of the ACM (Dec. 1992).
Bender, Educause Review, Sep./Oct. 2002.
Bender, et al., "Newspace: Mass Media and Personal Computing," Proceedings of USENIX, Conference, pp. 329-348 (Summer 1991).
Bollen, Johan et al., "Toward alternative metrics of journal impact: a comparison of download and citation data", Johan Bollen, Herbert Van de Sompel, Joan Smith, Rick Luce, Google.com, 2005, pp. 1419-1440, Mar. 2005 (22 pages).
Bunzel, Tom, "Easy Digital Music", QUE Publisher, Aug. 18, 2004, Chapters 5 and 8.
Cano, Pedro et al., "On the Use of FastMap for Audio Retrieval and Browsing", The International Conference on Music Information Retrieval and Related Activities (ISMIR 2002), Paris, France, Oct. 2002 (2 pages).
Carlson, et al., "Internet Banking Market Developments and Regulatory Issues in the New Economy: What Changed, and the Challenges for Economic Policy . . . ", May 2001, http://www.occ.gov/netbank/SGEC2000.pdf.
Chao-Ming, et al., "Design and Evaluation and mProducer: a Mobile Authoring Tool for Personal Experience Computing", MUM 2004, College Park, Maryland, USA, Oct. 27-29, 2004.
Connell, Lain et al., "Ontological Sketch Models: Highlighting User-System Misfits", in P. Palanque, E. O'Neill and P. Johnson, editors, Proceedings of Human Computer Interaction (HCI) Bath, England, Sep. 2003, London Springer, pp. 1-16.

Das, A et al., "Google News Personalization: Scalable Online Collaborative Filtering", in WWW '07: Proceedings of the 16th international conference on World Wide Web, pp. 271-280, New York, NY, USA, 2007.
Dean, J et al., "MapReduce: Simplied Data Processing on Large Clusters", Communications of the ACM, 51(1):107-113, 2008.
Dempster, Y, "Maximum Likelihood from Incomplete Data via the EM Algorithm", Journal of the Royal Stat. Soc., Ser. B., 39:1047-1053.
Deshpande, Mukund et al., "Item-Based Top-N Recommendation Algorithms", ACM Transactions on Information Systems, 22:1 (Jan. 2004), pp. 143-177.
Hofmann, T, "Latent Semantic Models for Collaborative Filtering", ACM Transactions on Information Systems, 22:89-115, 2004.
Hofmann, T, "Unsupervised Learning by Probabilistic Latent Semantic Analysis", Mach. Learn., 42:177-196, 2001.
Indyk, P et al., "Low-Distortion Embeddings of Finite Metric Spaces", In Handbook of Discrete and Computational Geometry, pp. 177-196. CRC Press, 2004.
Jacucci, Giulio et al., "IP City, Integrated Project on Interaction and Presence on Urban Environments—Demonstrators on Large-Scale Events Applications", ipcity.eu; pp. 1-37; Feb. 9, 2007.
Lazar, N A., "Bayesian Empirical Likelihood", N.A. Lazar; Bayesian Empirical Likelihood; Technical Report, Carnegie Mellon University, Department of Statistics, 2000 (26 pages).
Lie, "The Electronic Broadsheet—All The News That Fits The Display", MIT Master's Thesis, pp. 1-96 (Jun. 1991).
Lippman, et al., "News and Movies in the 50 Megabit Living Room", IEEE/IEICE, Global Telecommunications Conference, pp. 1976-1981 (Nov. 15, 1987).
Loeb, Shoshana, "Delivering Interactive Multimedia Documents over Networks", IEEE Communications Magazine, May 1992 (8 pages).
Logan, Beth, "A Music Similarity Function Based on Signal Analysis", IEEE International Conference on Multimedia and Expo (ICME), Tokyo, Japan, Aug. 2001, IEEE Press, pp. 952-955.
Logan, Beth, "Content-Based Playlist Generation: Exploratory Experiments", The International Conference on Music Information Retrieval and Related Activities (ISMIR 2002), Paris, France, Oct. 2002 (2 pages).
Maidin, Donncha et al., "The Best of Two Worlds: Retrieving and Browsing", Proceedings of the COST G-6 Conference on Digital Audio Effects (DAFX-OO), Verona, Italy, Dec. 7-9, 2000 (4 pages).
McCarthy, et al., "Augmenting the Social Space of an Academic Conference", Information School, University of Washington and Department of Computer Science and Engineering, University of Minnesota, pp. 1-10, Nov. 6-10, 2004.
Australia Examiner's 1st Report on patent application No. 2010212503 mailed Jun. 27, 2011.
European Application No. EP 10175868.8, Extended InternationaSearch Report, dated Dec. 21, 2010 (6 pages).
PCT International Search Report and Written Opinion dated Nov. 8, 2010, PCT Application No. PCT/US2010/47955 (16 pages).
Notess, Mark et al., Variations2: Toward Visual Interface for Digital Music Libraries, Second International Workshop on Visual Interfaces to Digital Libraries, 2002 (6 pages).
O'Connor, M et al., "PolyLens: A Recommender System for Groups of Users", European Conference on Computer Supported Co-Operative Work at Bonn, Germany, 2001, pp. 199-218.
Orwant, J, "Appraising the User of User Models: Doppelganger's Interface", in: A. Kobsa and D. Litman (eds.), Proceeding of the 4th International Conference on User Modeling, Aug. 15-19, 1994 (12 pages).
Orwant, Jonathon L., "Doppelganger Goes to School: Machine Learning for User Modeling", MIT Master of Science Thesis, Sep. 1993 (90 pages).
Orwant, Jonathon L., "Doppelganger: A User Modeling System", MIT Bachelor's Thesis, Jun. 1991 (66 pages).

Pachet, Francois et al., "A Taxonomy of Musical Genres, Content-Based Multimedia Information Access Conference (RIAO)", Paris, Apr. 2000 (8 pages).
Paek, Tim et al., "Toward University Mobile Interaction for Shared Displays", Microsoft Research, Redmond, WA; pp. 1-4; Nov. 6-10, 2004. Retrieved from the internet: <URL: http://research.microsoft.com/-timpaekiPapers/cscw2004.pdf>.
Pampalk, Elias et al., "Content-based Organization and Visualization of Music Archives", ACM Multimedia, Juan les Pins, France, Dec. 2002, pp. 570-579.
Pauws, Steffen et al., "PATS: Realization and User Evaluation of an Automatic Playlist Generator", The International Conferences on Music Information Retrieval and Related Activities (ISMIR 2002), Paris, France, Oct. 2002 (9 pages).
Platt, John C. et al., "Learning a Gaussian Process Prior for Automatically Generating Music Playlists", Microsoft Corporation, 2002, pp. 1-9.
Platt, John S., "Fasting Embedding of Sparse Music Similarity Graphs", Microsoft Corporation, 2004 (8 pages).
Rauber, Andreas et al., "The SOM-enhanced JukeBox: Organization and visualization of Music Collections Based on Perceptual Models", Journal of New Music Research, vol. 32, Nov. 2, 2003, pp. 193-210.
Rudstrom, Asa, "Co-Construction of Hybrid Spaces", A Dissertation submitted to the University of Stockholm; Department of Computer and Systems Sciences Stockholm University, Nov. 2005 (69 pages).
Scheible, Jurgen et al., "MobiLenin—Combining a Multi-Track Music Video, Personal Mobile Phones and a Public Display into Multi-User Interactive Entertainment", Media Lab, University of Art and Design, Helsinki, Finland; pp. 1-10; Nov. 6-10, 2005.
Scihira, I, "A Characterization of Singular Graphs", Electronic Journal of Linear Algebra, 16:451-462, 2007.
Shneiderman, Ben, "Tree Visualization with Tree-Maps: 2-d Space-Filling Approach", ACM Transactions on Graphics, vol. 11, No. 1, Jan. 1992, pp. 92-99.
Shneiderman, Ben, "Treemaps for Space-Contrained Visualization of Hierarchies", http://www.sc.umd.edu/heil/treemap- history, last updated Apr. 28, 2006, (16 pages).
Smart Computing, "The Scoop on File-Sharing Services", Dec. 2000, vol. 11, Issue 12, pp. 30-33. Available at www.smartcomputing.com/editorial/article.asp?article=articles%2F2000%Fs1112%2FOBs12.asp.
Strands Business Solutions, "Integration Document v.2.0", Published May 2008, Retrieved from the internet <URL: http://recommender.strands.com/doc/SBS-Integration-Document.pdf> (18 pages).
Sun, Jimeng et al., "Incremental tensor analysis: theory and applications", ACM, Oct. 2008, pp. 1-37.
Thompson, John, "A Graphic Representation of Interaction With the Nexis News Database", MIT Thesis, May 1983 (74 pages).
Tzanetakis, George et al., "MARSYAS3D: A Prototype Audio Browser-Editor Using a Large Scale Immersive Visual and Audio Display", in Proceedings of the 2001 International Conference on Auditory Display, Espoo, Finland, Jul./Aug. 2001 (5 pages).
Wolfers, Justin et al., "Prediction Markets", Journal of Economic Perspectives, Spring 2004, pp. 107-126, vol. 18, No. 2.
Yates, Alexander et al., "ShopSmart; Product Recommendations through Technical Specifications and User Reviews", Temple University, CIKM, Oct. 26-30, 2008, Napa Valley, CA, USA (2 pages).
Yen, Yi-Wyn, "Apple announces a 32GB iPhone 3G by Jun. 15, 2009", The Industry Standard, Apr. 2, 2009, http://www.thestandard.com/preditions/channel/hardware, downloaded Apr. 8, 2009.

* cited by examiner

Figure 1. Disc Table
Table contains one row for each album in the lala catalog.
Members can browse these albums and add them to their
want or have lists

| Field | Description of Key Fields | Type | Key |
|---|---|---|---|
| lalaid | unique album identifier | bigint(20) | PRI |
| version | album version | varchar(6) | |
| status | | int(11) | |
| nbdisc | 3rd party identifiier | int(11) | |
| upc | UPC for album | varchar(16) | MUL |
| hash | | varchar(16) | |
| cddbid | | int(11) | |
| duration | | int(11) | |

Figure 2. Disc Properties
Table contains one row for each property for each album in
the Disc Table. Properties are defind in the Property
Identifiers. Examples of properties include performer, song
titles, labels

| Field | Description of Key Fields | Type | Key |
|---|---|---|---|
| pvid | unique album identifier | int(11) | PRI |
| pid | unique identifier for property | int(11) | PRI |
| value_md5 | | int(11) | MUL |
| value | property value | text | |

Figure 3. Disc Property Identifiers
Definition of the various properties in the Disc Properties table associated with each album in the Disc Table

| id | type | name |
|---|---|---|
| 0 | 0 | undefined |
| 1 | 1 | Title |
| 2 | 1 | Genre |
| 3 | 2 | Year |
| 4 | 1 | Type |
| 5 | 1 | Performer |
| 6 | 1 | Composer |
| 7 | 1 | Ensemble |
| 8 | 1 | Conductor |
| 9 | 1 | WM Sample |
| 10 | 1 | RA Sample |
| 11 | 1 | Label |
| 12 | 1 | Subgenre |

Figure 4. Demand Table
Table contains one row per album in a member's wait list that is available for trade

| Field | Description of Key Fields | Type | Key |
|---|---|---|---|
| partitionkey | database partition | smallint(3) | PRI |
| discid | unique album identifier | bigint(20) | PRI |
| wmd5key | id of user wanting disc | smallint(5) | PRI |
| wuserkey | id of user wanting disc | int(11) | PRI |
| wtimestamp | date added to want list | bigint(20) | |
| score | quality score for album | int(11) | |
| ship_discid | id to trade fulfilled | bigint(20) | |
| ship_timestamp | date shipped | bigint(20) | |
| status | Attributes for disc demand | Integer(11) | |
| user_priority | user priority score | smallint(5) | |

Figure 5. Inventory Table
Table contains one row per album in a member's have list that is available for trade.

| Field | Description of Key Fields | Type | Key |
|---|---|---|---|
| partitionkey | database partition | smallint(3) | PRI |
| discid | unique album identifier | bigint(20) | PRI |
| omd5key | id of user owning disc | smallint(5) | PRI |
| ouserkey | id of user owning disc | int(11) | PRI |
| otimestamp | date added to want list | bigint(20) | |
| status | Attributes of disc owned | Integer(11) | |
| score | quality score for album | int(11) | |

Figure 6. User Table
Table contains one row per member. Includes unique ID for member, contact info, mailing info, billing info, date of registration, date of birth, and invites.

| Field | Description of Key Fields | Type | Key |
|---|---|---|---|
| partitionkey | database partition | smallint(3) | PRI |
| userkey | unique id for user | int(11) | PRI |
| md5key | unique id for user | smallint(5) | PRI |
| userid | user account id | varchar(128) | |
| nickname | user online name | varchar(64) | |
| first_name | member first name | varchar(32) | |
| last_name | member last name | varchar(64) | |
| email | member email | varchar(128) | |
| dor | date of registration | date | |
| dob | date of birth | date | |
| ship_addrid | address identifier | int(11) | |

Figure 7. Address Table
Table contains one row per mailing address entered by a member

| Field | Description of Key Fields | Type | Key |
|---|---|---|---|
| partitionkey | database partion | smallint(3) | PRI |
| addrid | address id | int(11) | PRI |
| userkey | unique id for user | int(11) | |
| md5key | unique id for user | smallint(5) | |
| status | status of account | int(11) | |
| timestamp | date address added | bigint(20) | |
| name | mailing name | varchar(64) | |
| company | mailing company | varchar(64) | |
| addr1 | first line in address | varchar(128) | |
| addr2 | second line in address | varchar(128) | |
| city | city | varchar(64) | |
| state | state | varchar(32) | |
| zip | zip code | varchar(10) | |
| delivery_code | usps delivery route code | varchar(8) | |
| country | country | varchar(4) | |

Figure 8. Shipping Supplies Table
Table contains one row for each order of shipping supplies sent to customers.

| Field | Description of Key Fields | Type | Key |
|---|---|---|---|
| partitionkey | database partition | smallint(3) | PRI |
| orderid | id for supply order shipped | int(11) | PRI |
| md5key | id of recipient of order | int(11) | |
| userkey | id of recipient of order | int(11) | MUL |
| status | status of order | int(11) | |
| envelopes | envelopes in order | int(11) | |
| inserts | plastics cases in order | int(11) | |
| order_timestamp | date of order | bigint(20) | |
| delivery_timestamp | date of delivery of order | bigint(20) | |
| ship_addrid | id to address table for mailing address | int(11) | |

Figure 9. User Score Table
Table contains one row member and is used to store the member's trade limit ID, their total trades, good trades, bad trades, shipping materials ordered, credits, and last trade and login dates

| Field | Description of Key Fields | Type | Key |
|---|---|---|---|
| partitionkey | database partition | smallint(3) | PRI |
| userkey | identifier for user wanting disc | int(11) | PRI |
| md5key | identifier for user wanting disc | smallint(5) | PRI |
| limitid | User Credit Limit Bucket | int(11) | |
| good_ship | total ships in good condition | int(11) | |
| good_receive | total receives in good condition | int(11) | |
| bad_ship | total ships in bad condition | int(11) | |
| bad_receive | total receives in bad condition | int(11) | |
| shipping | total ships | int(11) | |
| receiving | total receives | int(11) | |
| envelopes | total envelopes sent | int(11) | |
| inserts | total plastic cases sent | int(11) | |
| ship_credit | trade credits | int(11) | |
| receive_credit | trade credits | int(11) | |
| last_shipped_timestamp | last time CD is shipped | bigint(20) | |
| last_received_timestamp | last time CD is received | bigint(20) | |
| ownlist_timestamp | time of last addition to have list | bigint(20) | |
| ownlist_count | have list count | int(11) | |
| waitlist_timestamp | time of last addition to want list | bigint(20) | |
| waitlist_count | want list count | int(11) | |
| login_timestamp | last time user logged in | bigint(20) | |

Figure 10. Trade Limits Table
Table contains one row per trade limit group. For each group, the table specifies the current trade limit values.

| Field | Description of Key Fields | Type | Key |
|---|---|---|---|
| partitionkey | database partition | smallint(3) | PRI |
| limitid | User Credit Limit Bucket | int(11) | PRI |
| min_balance | Minimum trade balance | int(11) | |
| max_balance | Maximum trade balance | int(11) | |
| max_outbound | Maximum unconfirmed trades | int(11) | |

Figure 11. Waitlist Table
Table contains one row per album in a member's wait list

| Field | Description of Key Fields | Type | Key |
|---|---|---|---|
| partitionkey | database partition | smallint(3) | PRI |
| userkey | identifier for user wanting disc | int(11) | PRI |
| md5key | identifier for user wanting disc | smallint(5) | PRI |
| discid | unique album identifier | bigint(20) | PRI |
| orig_discid | | bigint(20) | |
| timestamp | date added to want list | bigint(20) | |
| status | Attributes of disc demand | int(11) | |
| ship_discid | disc shipped to fulfill demanded | bigint(20) | |
| ship_timestamp | date shipped | bigint(20) | |
| user_priority | user priority score | smallint(5) | |

Figure 12. Havelist Table
Table contains one row per album in a member's have list

| Field | Description of Key Fields | Type | Key |
|---|---|---|---|
| partitionkey | database partition | smallint(3) | PRI |
| userkey | identifier for user owning disc | int(11) | PRI |
| md5key | identifier for user owning disc | smallint(5) unsigned | PRI |
| discid | unique album identifier | bigint(20) | PRI |
| timestamp | date added to have list | bigint(20) | |
| status | Attributes of disc owned | int(11) | |
| priority | user priority score | smallint(5) | |
| nomail_until | | date | |
| inventory_date | date before disc is available for trade | date | |

Figure 13. Shipping Table
This table conatins one row for each trade made between members.
Includes: the members involved in the trade, the album traded, the
quality score of the album, envelopes used for the trade, scan of such
envelopesand the result of the trade.

| Field | Description of Key Fields | Type | Key |
|---|---|---|---|
| partitionkey | database partition | smallint(3) | PRI |
| shipid | unique identifier for trade | int(11) | PRI |
| discid | unique album identifier | bigint(20) | |
| wmd5key | identifier for user receiving disc | smallint(5) | MUL |
| wuserkey | identifier for user receiving disc | int(11) | |
| wtimestamp | date added to want list | bigint(20) | |
| omd5key | identifier for user shipping disc | smallint(5) | |
| ouserkey | identifier for user shipping disc | int(11) | |
| otimestamp | date added to have list | bigint(20) | |
| ship_timestamp | date CD is shipped | bigint(20) | MUL |
| recv_timestamp | date CD is received | bigint(20) | |
| recv_cond | condition CD is received in | smallint(5) | |
| quality score | quality score for album at the time of trade | int(11) | |
| envelope_code | envelope identifier used for shipping | varchar(8) | MUL |
| code_timestamp | date envelope code reported | bigint(20) | |
| usps_timestamp | date envelope is scanned | bigint(20) | |
| owner_planid | shipper billing plan | int(11) | |
| waiter_planid | receiver billing plan | int(11) | |

Figure 14. Artist Table
Table contains one row for each artist that registers with lala to
receive compensation when their albums are traded.

| Field | Description of Key Fields | Type | Key |
|---|---|---|---|
| artistid | Unique artist ID | int(11) | PRI |
| first_name | Contact First Name | varchar(32) | |
| last_name | Contact Last name | varchar(64) | |
| band_name | Band Name | varchar(128) | |
| email | Contact email | varchar(128) | |
| addr1 | Contact address | varchar(128) | |
| addr2 | Contact address | varchar(128) | |
| city | Contact address | varchar(64) | |
| state | Contact address | varchar(32) | |
| zip | Contact address | varchar(10) | |
| country | Contact address | varchar(4) | |
| note | Special instructions | text | |

Figure 15. Listen Table
Table contains one row for each billable item per customer

| Field | Description of Key Fields | Type | Key |
|---|---|---|---|
| partitionkey | database partition | smallint(3) | PRI |
| listenid | id for song listened | int(11) | PRI |
| md5key | user identifier for listener | smallint(5) | MUL |
| userkey | user identifier for listener | int(11) | |
| status | attributes of song | int(11) | |
| timestamp | date song was listened | bigint(20) | |
| ctimestamp | date song was added to database | bigint(20) | |
| ses | id of user billed | bigint(20) | |
| discid | discid of album for song | bigint(20) | MUL |
| artist | performer of song | varchar(64) | |
| album | album name of song | varchar(64) | |
| track | track number of song | varchar(64) | |
| genre | genre for song album | varchar(64) | |
| year | year of release | smallint(6) | |
| host | id to host collecting listen data | varchar(16) | |
| os | operating system collecting listens | varchar(16) | |
| version | version of os collecting listen data | varchar(16) | |

Members with collections similar to mine

| Have List | Want List | Traded | | music artists albums songs |
|---|---|---|---|---|
| 310 (84) | 46 (2) | 405 | lala™ | |

Recent traders |
Jose ☒ | Tyke ☒ | Tyke/DJ ☒ | Bryan Jay ☒ (waxm.com)

My Profile ● ○ ○
change image
my karma page
my account

Share lala
Invite Friends
Spread the word

Top Radio Stations
- Noisepop 2007 — Live WOXY.com
- WOXY, the future — "The 25 Best Music"
- WOXY, Vintage — Vintage modern rock — WOXY Vintage
- KUSF - 90.3FM San — To serve and represent — KUSF 90.3FM
- BAGeL radio — Indie Rock Noise Pop
- KSSU, Sacramento — Hip Hop, Alt/Indie, — KSSU
- WMXM - College — WMXM is the — WMXM
- WEXP - La Salle — La Salle University — WEXP

Trading Messages (7) | Ship Reminders (1)

showing

- Feb 05 undisclosed
- Dec 11 undisclosed
- Nov 28 undisclosed
- Oct 21 me, undisclosed (2)
- Sep 15 undisclosed Recovering The
Live From Iraq
My Digital World
Trace
X-Tra Naked

Can't wait for albums? Buy new CDs in the

ThirdShiftGrottoSlack
Jay Farrar
[New $5.55]

Pink Moon
Nick Drake
[New $7.58]

Sebastopol
Jay Farrar
[New $8.49]

Rehearsals For Depart
Damien Jurado
[New $9.21]

Hot Tags

FIG. 16 members tag        home | radio | store | forums | help | signout
[Search]

Myfriends | Members with collections similar to mine

| Carole (209) ☒ | ibn ☒ | abizz ☒ | Vanceman ☒ | ▶ |

[Confirm Receive (2)]

1-5 of 7 ▶▶      ☐ Include sent messages

Satellites    Shipped by me    view | reply | delete
              Shipped to me    view | reply | delete
              Shipped to me    view | reply | delete
              Shipped to me    view | reply | delete
              Shipped to me    view | reply | delete lala store

Carnavas
Silversun Pickups
[New $7.99]

Mermaid Avenue Vol.:
Billy Bragg/Wilco
[New $8.49]

Noise Floor
Bright Eyes
[New $8.59]

Mermaid Avenue
Billy Bragg/Wilco
[New $8.69]

My Blurbs ▼

RaboutB
Thanks!
-Feb 27 2:36pm
    reply | edit | delete

Dasi awaits 4.24,...
Monkeyboy lives (6):
Wing dang doodle!
-Feb 26 12:43pm
    view | reply | edit | delete Spocktoberfest
Are you able to setup more folks that want
radio station access? There are
a number of people how have
replied to the thread in the
forums.
-Feb 22 2:08pm
    reply | edit | delete stevebass
Billy -- Are you still a
jazz fan? Cool,
because LaLa released new
CDs, so the Straight Ahead Jazz
station is up to 10 hours -- with
cuts from Kenny Burrell, Charles
Mingus, Clifford Brown, Herbie
Hancock, and other pure jazz
artists.
Here's the link:
http://tinyurl.com/3yjqmy
-Steve

FIG. 16 (Cont.)

Album Details Page

Have List | Want List | Traded | | home | radio | store | forums | help | signout
311 (83) | 45 (1) | 405 | lala™ | music artists albums songs members tag
| | | | [Search]

Member who own this album | Members owning CDs like this album

| | | | | |
|---|---|---|---|---|
| coltond (lalaunc--) | Fireant | KClayton09 | Scrumpy seZ S: | brock (f+b pleas-- | sigmund | Joe | J.P. |

ThirdShiftGrottoSlack (2002) by Jay Farrar (supply:21, demand:5)

add review — Enter your review of this album:

Reviews
No reviews have been written for this album. Be the first to write a review!
Members can see all of the reviews you've written on your public lala page.

Rate: ☆☆☆☆☆ [Submit]

Lala Recommends
- A Ghost is Born by Wilco [want] [have]
- Straightaways by Son Volt [want] [have]
- Uncle Tupelo 89/93: An Anthology by Uncle Tupelo [want] [have]
- Bee Thousand by Guided By Voices [want] [have]
- Blood On The Tracks by Bob Dylan [want] [have]
- Rock 'N' Roll by Ryan Adams

- Beck
- Johnny Cash
- Whiskeytown
- Neil Young
- Social Distortion
- Gillian Welch
- Centro-Matic
- Drive-By Truckers
- Richard Buckner
- M.Ward
- The Flaming Lips
- Steve Earle
- R.E.M.
- Paul Westerberg
- Old 97's

Album

✓ I want it ☒
New $5.55
del.icio.us Digg this

Year: 2002
Genre: Rock & Pop
UPC: 6996751138271

Album Tracks
1. Greenwich Time
2. Damn Shame - (Memphis mix)
3. Station To Station
4. Kind Of Madness
5. Dues

Album Tags
- Alternative - 1 votes
- Gone Solo - 1 votes
- Rock & Pop - 1 votes
- Singer/Songwriter - 1 votes

Tag Album
Tag this: album
Or use one of these:
- lala get it cheap
- Rock & Pop
- unplugged
- Rock En Espanol
- Alternative Letin

Add to Set
- latin classics

Have List Page home | radio | store | forums | help | signout music artists albums songs members tag

[Search]

| Have List | Want List | Traded |
|---|---|---|
| 311 ⑱ | 45 ① | 405 lala™ |

Your Want List (view trading history | view billing history)

[CDs] [Want (311)] [CDs Requested (92)] Search your want list... [Search]

Need more shipping supplies? Click here to request more.

showing 1-20 of 311 ▷

| | Album & Artist | Ship | Keep | Art | Delete | Date▽ |
|---|---|---|---|---|---|---|
| | Live At Raji's by Dream Syndicate | ○ | ○ | ⊘ | ☒ | 3/01/07 |
| | Holy Roller Novocaine by Kings Of Leon | [ship it] | ○ | ⊘ | ☒ | 2/06/07 |
| | The Trinity Session by Cowboy Junkies | | ○ | ⊘ | ☒ | 1/31/07 |
| | The Captain by Kasey Chambers | [ship it] | ○ | ⊘ | ☒ | 1/31/07 |
| | No Depression by Uncle Tupelo | [ship it] | ○ | ⊘ | ☒ | 1/18/07 |
| | Live From Ireq by 4th25 | | ○ | ⊘ | ☒ | 12/20/06 |
| | X&Y by Coldplay | [ship it] | ⊘ | ⊘ | ☒ | 12/20/06 |
| | Either/Or by Elliott Smith | [ship it] | ○ | ⊘ | ☒ | 12/15/06 |
| | OK Computer by Radiohead | | ○ | ⊘ | ☒ | 12/13/06 |
| | Souls Aflame by O.A.R. | [ship it] | ○ | ⊘ | ☒ | 12/09/06 |
| | Unplugged by Eric Clapton | [ship it] | ○ | ⊘ | ☒ | 12/04/06 |
| | La Oreja De Van Gogh En Directo: Lo Que Te Co by La Oreja De Van Gogh | [ship it] | ○ | ⊘ | ☒ | 12/02/06 |
| | Begin To Hope by Regina Spektor | | ○ | ⊘ | ☒ | 12/01/06 |
| | Riot On An Empty Street by Kings Of Convenience | | ○ | ⊘ | ☒ | 12/01/06 |
| | Pulp Fiction by Original Soundtrack | | ○ | ⊘ | ☒ | 11/30/06 |
| | Monkey Business | | ○ | ⊘ | ☒ | 11/30/06 |

Want more trades? Invite some friends

Quick List
Listing CDs you own? Enter the artist and/or title of your CD:
Artist: [ ]
Title: [ ]
[Find CD]

Share your Have List
My Have List | lala Find & buy music for $1
Trade my CDs at www.lala.com - only $1 each!!

Have List Basics
▷ The more you list, the more you get
▷ Add without commitment
▷ Share your collection without cost
▷ Q: Don't have shipping kits?
▷ Q: What CDs can I ship?
▷ Q: How do I know when to ship?

FIG. 19

Have List  Want List  Traded          music  artists  albums  songs  members  tag          home | radio | store | forums | help | signout
311 (83)   45 (1)    405    lala™                                              [ Search ]

Trade History Page

Your Trading History (view billing history)

[ Shipped CDs ] [ Received CDs ]

| Shipped On | Album | Shipped To | Status |
|---|---|---|---|
| | | showing 1-12 of 195 ▷ | |
| Feb 10 | Watertown by Mando Saenz | ▷ undisclosed | received |
| Feb 05 | Recovering The Satellites by Counting Crows | ▷ undisclosed | received |
| Jan 22 | Grammy Nominees 2002: Pop by Various Artists | ▷ undisclosed | received |
| Jan 22 | The Soul Sessions by Joss Stone | ▷ undisclosed | received |
| Jan 19 | Bring It On by Gomez | ▷ undisclosed | received |
| Nov 20 | Josh Groban by Josh Groban | ▷ undisclosed | received |
| Nov 20 | Now 4 by Various Artists | ▷ undisclosed | received |
| Nov 20 | John Mayer Trio Live by John Mayer Trio | ▷ undisclosed | received |
| Nov 12 | The Concretes by The Concretes | ▷ undisclosed | received |
| Oct 23 | Legalize It by Peter Tosh | ▷ undisclosed | received |
| Oct 20 | Foiled by Blue October | ▷ undisclosed | received |
| Oct 01 | The Battle For Everything by Five For Fighting | ▷ undisclosed | received |
| | | showing 1-12 of 195 ▷ | |

Trading Basics
▷ Sending a message to a Trader...
▷ The more you ship, the more you'll receive
▷ Ship promptly
▷ Confirm CDs you receive
▷ Q: Which trades will be charged to my credit card?
▷ Q: What do I do if I forget the address for a CD I agreed to ship?
▷ Q: How do I report problems with a CD I received?

| Risk Assessment Score | Min_Balance for the member's trade credit balance | Min_Balance for the member's trade credit balance | Max_Balance for the member's trade credit balance | Max_Outbound (Shipped discs not yet confirmed) |
|---|---|---|---|---|
| Less than 5 | 1 | -1 | 5 | 5 |
| Greater than 5, less than 10 | 2 | -1 | 10 | 5 |
| Greater than 10, less than 15 | 3 | -2 | 10 | 10 |
| Greater than 15, less than 50 | 4 | -2 | 15 | 10 |

Members Collection Page

| Have List | Want List | Traded | | music artists albums |
|---|---|---|---|---|
| 310 ⓼⓷ | 46 ② | 405 | lala™ | | eeplebert's Friends |

| contessakitty | ~~~ | teebishop (tray) | Kosmo Vinyl |
|---|---|---|---|

About eeplebert ▼

| Have List | Want List | Traded |
|---|---|---|
| 491 | 100 | 278 |

⊞ del.icio.us 🔗 Digg this 🔗
Member since: 4/27/06
Last Login: 2/27/07
Location: MN

[ add as friend ]

eeplebert's Reviews ▼

☆☆☆☆☆
Gizmodgery on Sep 27
Recorded on toy instruments... a fresh and dynamic album from Matt Mahaffey
　　　　edit | delete
☆☆☆☆☆
Greatest Hits: The Evidence on A solid collection but missing MANY of his best tracks. Fine for starters!

eeplebert's CD

[Have List] | Want List | Buy a

Filter by: None ▼ | Genre: All ▼ showing 1-12

Strange Little Girls Tori Amos
want have

These Are The Vistas The Bad Plus
want have

Purple Stone Temple Pilots
want have

Sound Museum Towa Tei
want have

The City Of Dolls Echo Depth Finders
want have

Purge Bif Naked
want have showing 1-12

FIG. 30 songs members tag     home | radio | store | forums | help | signout
[    ] [Search]

Members with collections similar to eeplebert's

| thickage | stuart319 | sota | luvanani |

Collection gift for this member ☐

[Artist: All ▾]  Too many? Try refining
of 491 ▷▷

Core Stone Temple Pilots
✓ I have it ☒

City Delirious Lionrock
[want] [have]

To Venus And Back (Disc) Tori Amos
[want] [have]

Power In Numbers Jurassic 5
[want] [have]

El Oso Soul Coughing
[want] [have]

A Gun Called Tension A Gun Called Tension
[want] [have]

of 491 ▷▷ eeplebert's Blurbs ▾
add a new blurb
[          ]
[Post]

Bravo (Art!!)
Hey, I have the weezer blue album front and back, i saw you needed it on the art want list
- Dec 11 6:27pm
reply | edit | delete (all art plz!) Big A thanks for sending both gas cds with front and back art! you rock!
-Nov 17 9:40am
reply | edit | delete ... eeplebent (4): after some thought, I'd say Seen A Ghost is most representative of their talents.
-Oct 11 4:44am
view | reply | edit | delete Scrumpy seZ Save NOLA
OT Plaese check out my comment to Bill at Forum today re Z Foundation and lend support if you agree. Thanks.

ARTICLE TRADING AMONG MEMBERS OF A COMMUNITY

CROSS REFERENCE TO RELATED APPLICATION

This application claims the benefit of U.S. Provisional Patent Application No. 60/779,759 filed Mar. 6, 2006.

BACKGROUND OF THE INVENTION

Online trading sites allow potential buyers and sellers of goods and services to locate each other. One popular type of online trading sites allow persons who have used goods to offer the goods to others and receive some form of value for the goods. Certain online trading sites that are designed for used goods allow for barter-type transactions. Although many barter-type trading sites exist, there is still a need for improved sites.

BRIEF SUMMARY OF THE INVENTION

In one preferred embodiment of the present invention, articles are traded among a plurality of members who are registered in a common community. Each member has an account including a trading credit balance and a mailing address. A user interface is provided that allows a member to enter articles that the member owns and is willing to trade and articles that the member wants to own. The user interface also receives article trading instruction messages. An administration computer hosts the plurality of members and facilitates article trades among the members. The administration computer identifies matches between owned and wanted articles. For each identified match, an article trading instruction message is sent to the article owner requesting that the article owner mail the owned article to the mailing address of the member who wants to own the article. If the member sends the article, a trading credit is posted to the member's account and a trading debit and a monetary charge is posted to the member's account who will be receiving the article. Each traded article has the same trading credit.

BRIEF DESCRIPTION OF THE DRAWINGS

The above summary, as well as the following detailed description of preferred embodiments of the invention, will be better understood when read in conjunction with the following drawings. For the purpose of illustrating the invention, there is shown in the drawings an embodiment that is presently preferred, and an example of how the invention is used in a real-world project. It should be understood that the invention is not limited to the precise arrangements and instrumentalities shown. In the drawings:

FIGS. 1-15 are data tables associated with the trading process.

FIGS. 16-23 show user interface display screens.

FIG. 26 shows a table associated with Risk Assessment Scores.

FIGS. 29-33 are display screens that show how members can share their interests with other members.

FIGS. 35 and 36 are screen displays related to an envelope supplying process.

Most of the figures are self-explanatory and thus most figures are not described in any detail. In the entity relationship diagrams, one-to-one relationships are shown with lines containing circles at each end, and one-to-many relationships are shown with lines containing a circle at one end and an arrow at the other end. Each of the figures show preferred embodiments of the present invention, and other embodiments are within the scope of the present invention.

Figure 40:
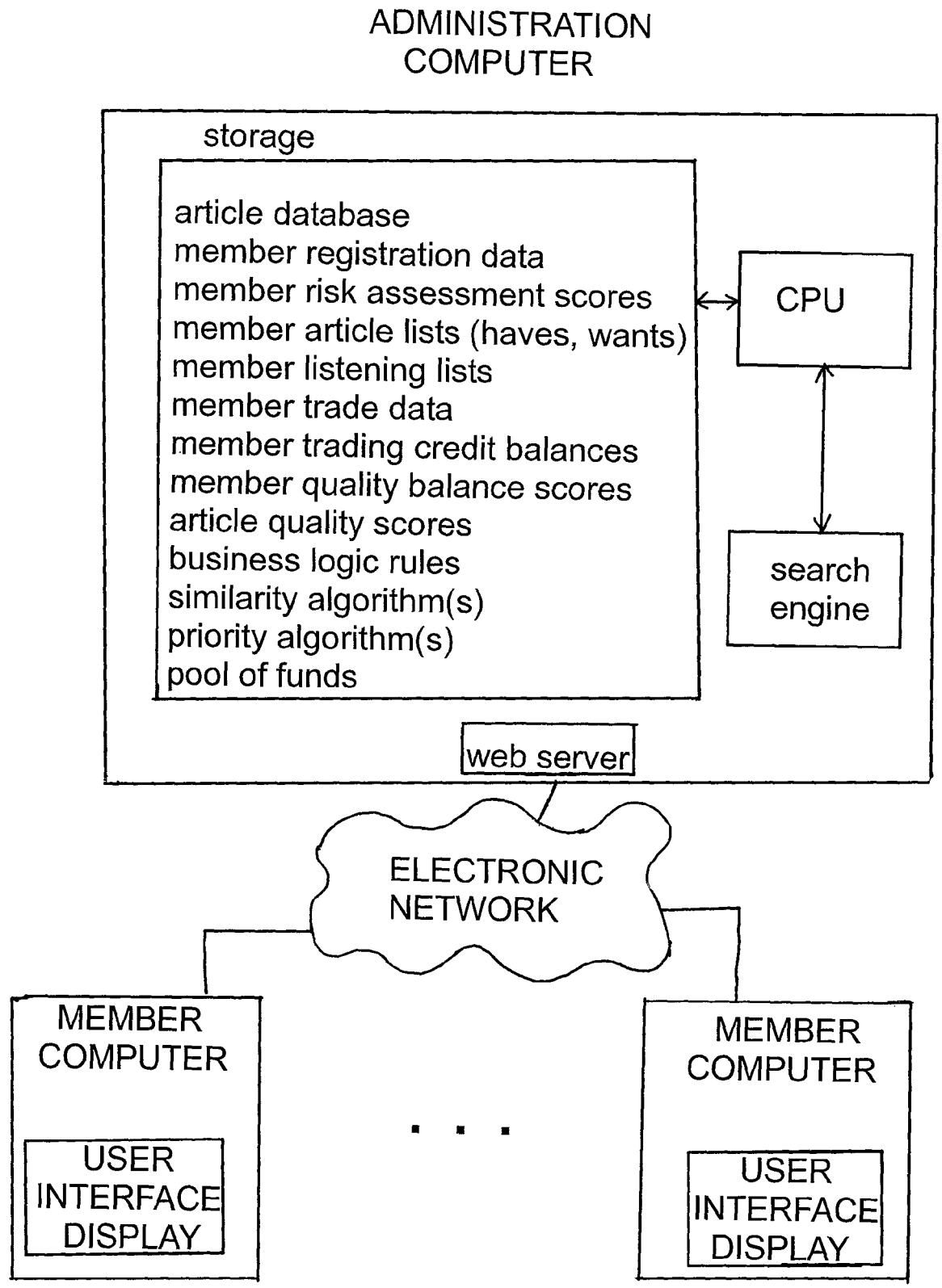

FIG. 40 shows a high level hardware architecture for implementing the trading process.

DETAILED DESCRIPTION OF THE INVENTION

Certain terminology is used herein for convenience only and is not to be taken as a limitation on the present invention.

The present invention is described in the context of a preferred embodiment of a web-based software application commercialized on the World Wide Web at lala.com, which is a music trading site. Lala.com is a service of la la media, inc., Palo Alto, Calif. However, the scope of the present invention is not limited to this particular implementation of the invention. The present invention is described in the context of a plurality of distributed computers, all of which are linked together by an electronic network, such as the Internet. The computers may be any type of computing device that allows a user to interact with a web site via a web browser. For example, the computers may be personal computers (PC) that run a Microsoft Windows® operating system. The computers may also be handheld, wireless devices.

I. DEFINITIONS

The following definitions are provided to promote understanding of the present invention.

article: an article is an item or commodity. An article can be in "tangible" form or can initially be in "intangible" form, but can be put in tangible form when traded. For example, a member of the community may own an article such as a music recording, video presentation, or printed material such as a book in electronic form only, along with rights to copy the article into a tangible form such as onto a portable electronic medium (e.g., CD, DVD) or paper, as well as the rights to transfer the article to another person. This type of intangible article can be traded in its tangible form.

own: ownership as used herein includes full ownership rights conveyed in accordance with the "first sale doctrine" (discussed below). Ownership also includes ownership of a limited use license (e.g., based on time, playback amounts). Accordingly, members can trade articles that convey only the remaining license rights, wherein the members would indicate the remaining license rights in their list.

album: one or more audio recordings issued together, originally released on 12-inch phonograph records (usually with record covers) and later on cassette audio tape and now usually on compact disc. Albums and compact discs (CDs) or "discs" are used interchangeably throughout the disclosure.

administration computer: a computer or processor that administers the trading platform for the members. The administration computer may be a single computer or a network of computers, such as a server or network of servers.

II. TRADING PROCESS

A. Overview of Trading Process

In one preferred embodiment of the present invention, articles are traded among a plurality of members registered in a common community using a computer-implemented process. Each member has an account that includes a trading credit balance and a mailing address. A user-interface allows a member to enter articles that the member owns and is willing to trade and articles that the member wants to own. The user interface also allows the member to receive article trading instruction messages. An electronic network, such as the Internet, is used to communicate between the user interface and an administration computer that is associated with the community. The administration computer hosts the plurality of members and facilitates article trades among the members via the electronic network. The administration computer identifies matches between owned and wanted articles. For each identified match, the administration computer sends an article trading instruction message to the article owner notifying the article owner that the article is requested. If the article owner agrees to send the article, the article owner is provided with the mailing address of the member who wants to own the article. The administration computer then posts a trading credit to the member's account who agreed to send the article and posts a trading debit and a monetary charge (interchangeably referred to herein as a "trading fee") to the member's account who will be receiving the article. The monetary charge is preferably posted only upon receipt by the administration computer of an article trading confirmation message from the member who was sent the article indicating that the member received the article in acceptable condition, or after a predetermined time has passed since the article was shipped. Thus, if the member does not provide an article trading confirmation message after the predetermined period of time (which is a time period greater than an expected shipping receipt date), it is presumed that the article was received in acceptable condition. If the member who was sent the article indicates that the article was received in unacceptable condition, the administration computer posts a trading credit and cancels the monetary charge to the member who was sent the article. During the estimated "in-transit" time period of the article, the trading credit and monetary charge is only temporarily posted and is not made final. Thus, the trading debit is not made final, and no monetary charge is officially made until the receipt confirmation stage. For example, if payment is made via a credit card, no credit card charge is submitted until receipt confirmation.

Each trading credit entitles a particular member to receive one article from any other member who is not necessarily a member that the particular member sent articles to. That is, the article trades are one-way article trades and members do not trade directly with each other.

In one preferred embodiment of the present invention, each traded article has the same trading credit. In one scheme, traded articles are all of the same type (e.g., audio compact discs (CDs), such as CDs containing musical recordings; audio recordings on other forms of computer-readable media). Even if all articles are of the same type, all articles do not have the same marketplace value. For example, popular, recently released CDs are inherently more valuable than older and/or less popular CDs. In the embodiment wherein each traded article has the same trading credit, members who own more valuable articles and agree to ship them to other members are preferably rewarded via a priority scheme that entitles the member to a higher priority for receiving articles that they want, as opposed to being rewarded with differing amounts of trading credits. More specifically, the administration computer uses a priority algorithm to select the member who will receive the article if there is more than one member who wants an article that another member owns and is willing to trade. The priority algorithm is described in more detail below, but can be generically described as being based upon one or more supply/demand indicators and trading behaviors. In a large, robust community of members, having a lower priority rating does not necessarily mean that the member will never receive requested articles. It merely means that the member may have to wait longer to receive the article. In some instances, however, a member might never receive a requested article that is particularly popular.

In alternative embodiments of the present invention, the articles may be of different types, such as books, CDs, and digital video discs (DVDs). That is, one type of article may be traded for another type of article.

To minimize abuses and promote fairness in the community, members are inhibited from trading under certain conditions. One condition is when their trading credit balance is less than a predetermined amount, thereby preventing members who have a trading credit balance that is less than the predetermined amount (e.g., zero) from receiving any articles wanted by the members. Another condition is when a member has more than a predetermined amount of trades that have been initiated but not yet completed ("in-transit" trades). The administration computer optionally assigns risk assessment scores to members based on their trading activity, as described in more detail below. The risk assessment scores can be used to set the trading credit balance number and the in-transit limit so that different members can have different trading credit balance numbers and in-transit limits. For example, members who have a steady, high level of trading activity may be allowed to have a very large number of in-transit articles and may also be allowed to run a negative trading credit balance.

In one preferred embodiment, members have the option to indicate on their list of owned articles whether they are agreeable to trade it. In this embodiment, members are not required to send an article after being requested to do so by the administration computer. The member can either respond to the administration computer with a message to that effect, or if no response is received from the member within a predetermined time period, the administration computer can presume that the member does not wish to send the article. That is, members are never required to trade. They are only notified of an opportunity to trade. Over time, most members who repeatedly receive requests for articles that they do not wish to send but have not marked as such, will eventually either change the article designation to "owned, not willing to trade" ("keep it" setting) or will send the article in response to a subsequent request. The "keep it" setting suppresses notifications of trading opportunities. If the "keep it" option is not set, the article owner will continue to see the notification of trading opportunity unless the administration computer deletes it due to fulfillment by another member, but the article owner does not have to act on the trading opportunity.

In another preferred embodiment, the user interface further allows a member to transfer a portion of their trading credit balance to another member.

B. Detailed Disclosure of Trading Process

FIGS. 1-14 are data tables associated with the trading process.

FIG. 16 shows a user interface display screen (interchangeably referred to herein as a "display screen" or a "page" or a "web page") that a member is shown after login. Various status messages are shown regarding the status of trading activity, and an upper region of the display screen marked with an oval includes icons of the identities of eight other members whose article collections (here, CDs) are similar to the logged in member. (The oval is shown for highlighting purposes only and does not appear on the actual display screen.)

FIGS. 17-23 are additional screen displays, as follows:

FIG. 17 is an album details page.

Figure 18:
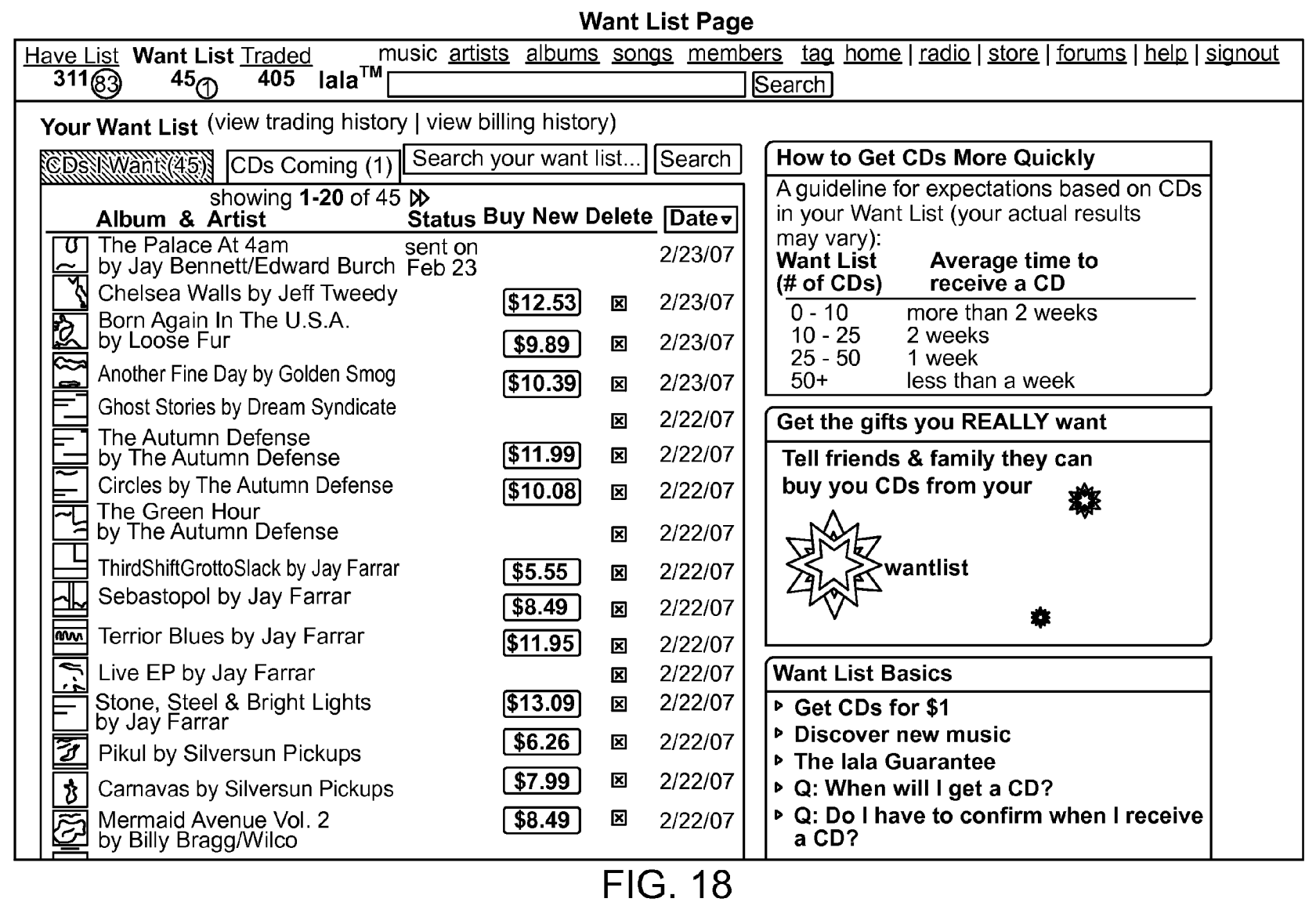

FIGS. 18 and 19 are want list and have list pages, respectively.

FIG. 20 is a trading history page.

Figure 21:
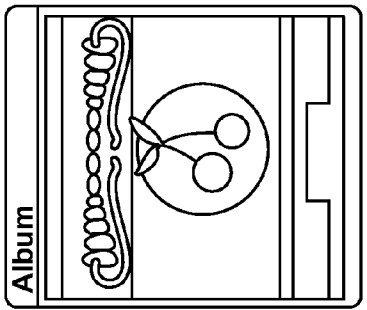
Figure 22:
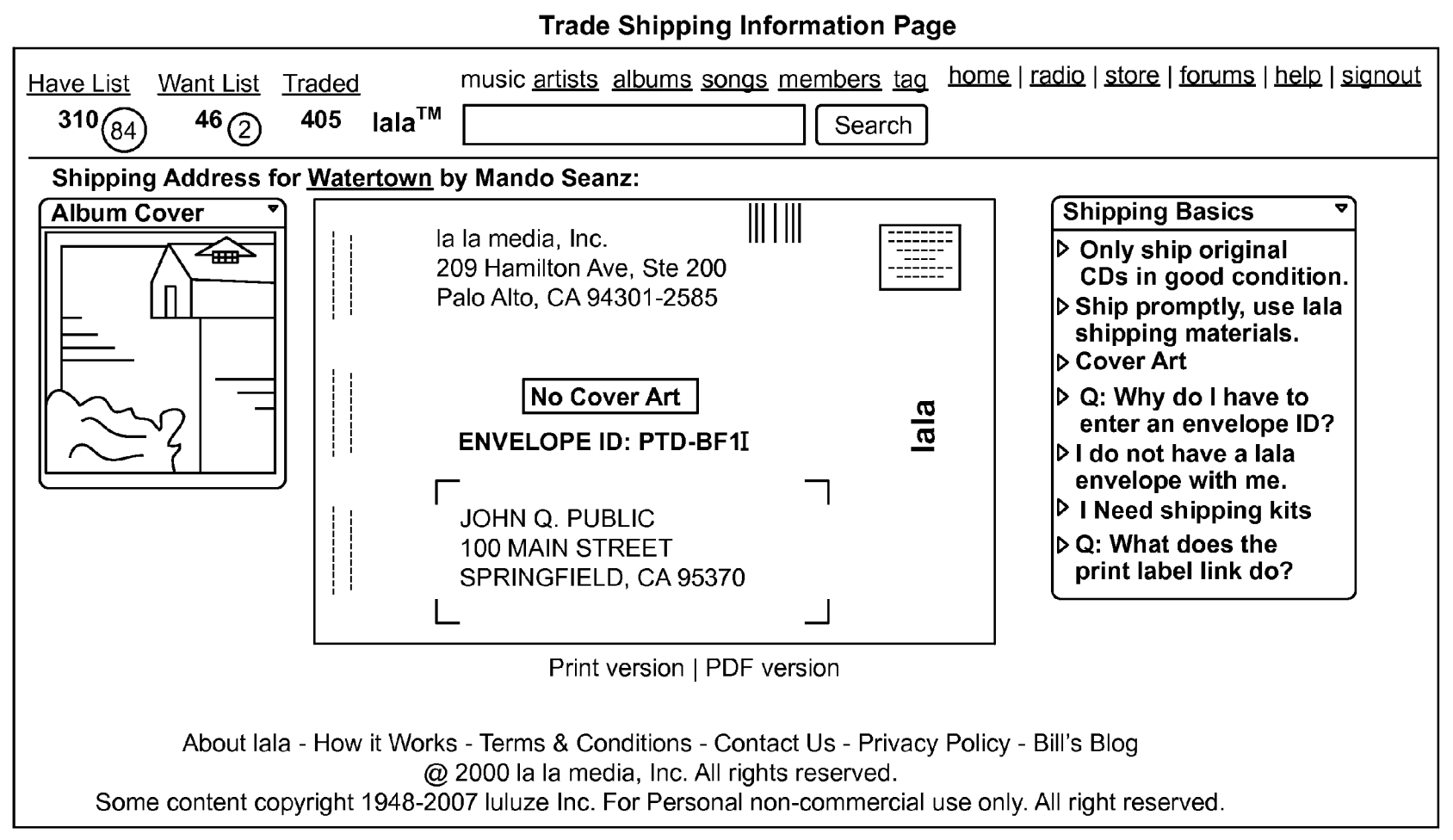
Figure 23:
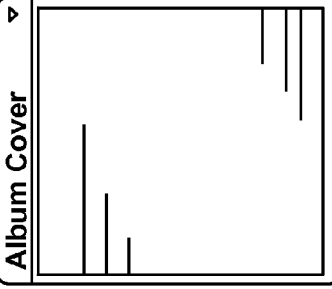

FIGS. 21-23 show pages associated with shipping and receiving CDs during trade activity. FIG. 21 shows an agree to ship page, FIG. 22 shows trade shipping information page, and FIG. 23 shows a trade received confirmation page.

Figure 24:
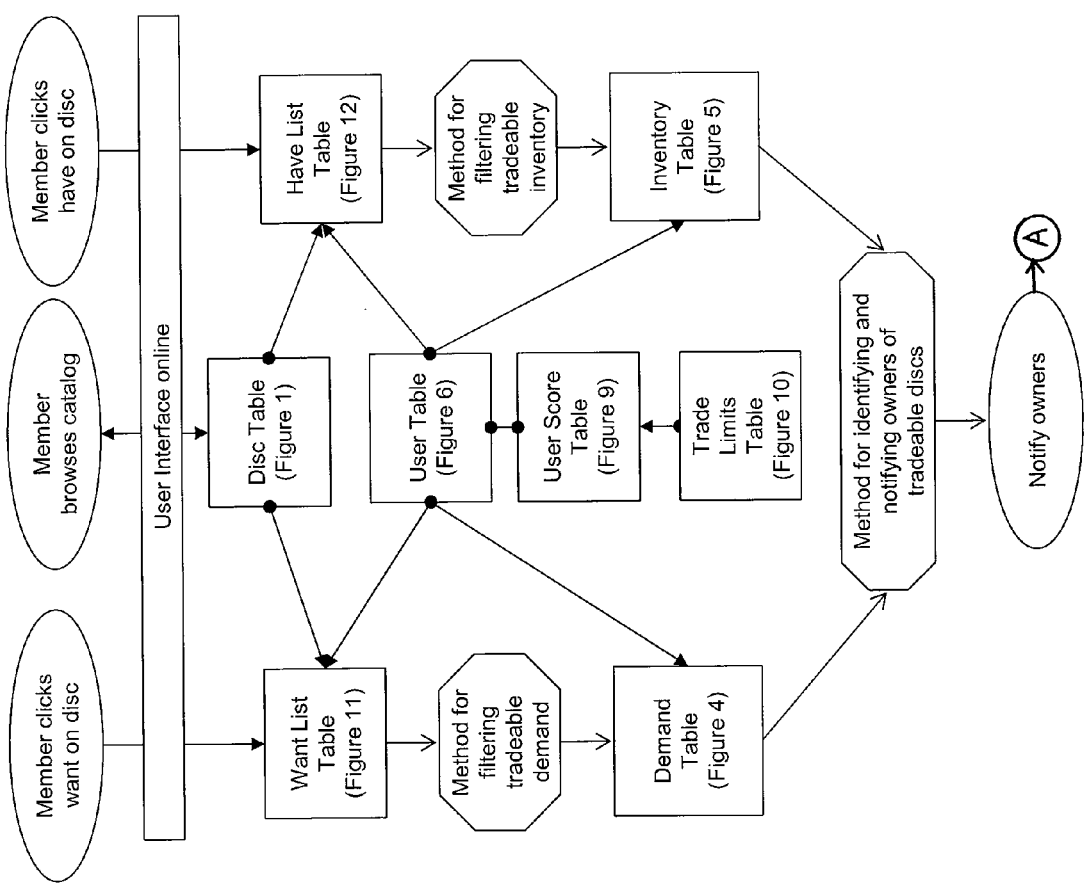
FIGS. 24-25, taken together, show a combination flowchart/entity relationship diagram for the trading process.
Figure 25:
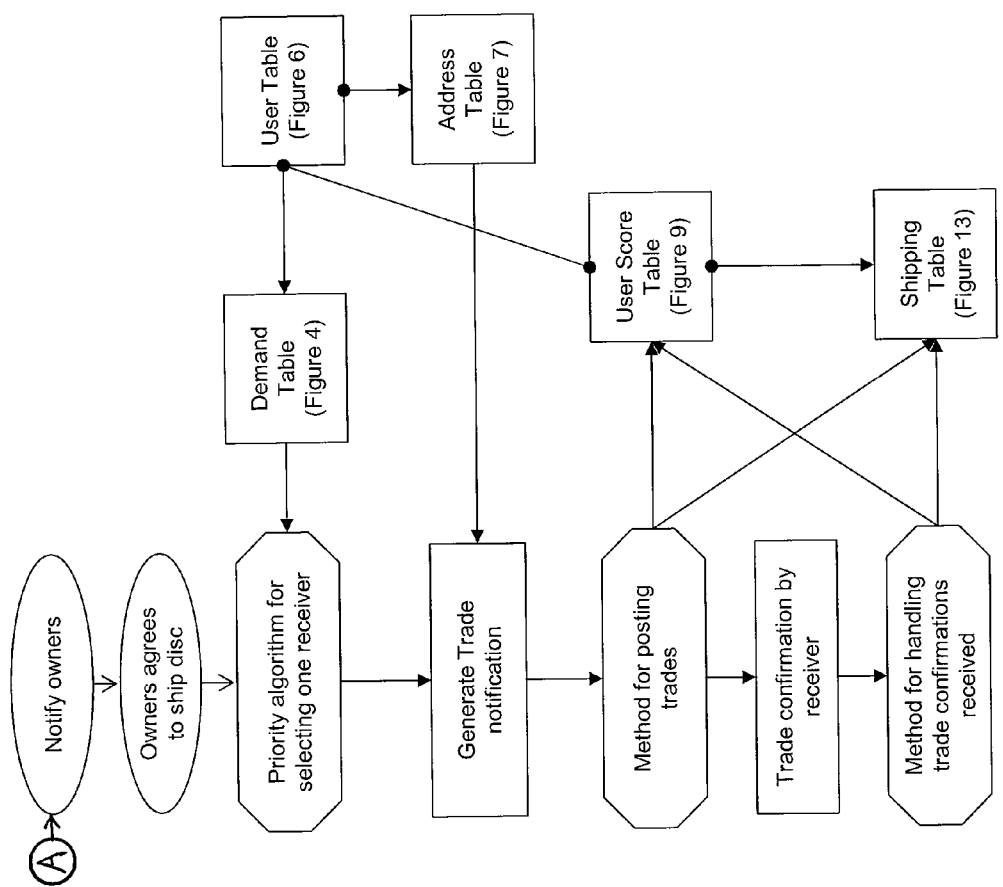

FIGS. 24-25, taken together, show a combination flowchart/entity relationship diagram for the trading process.

FIG. 40 shows a high level hardware architecture for implementing the trading process.

Method for Filtering Tradeable Demand

The administration computer generates a list of tradeable requested discs and stores them in the Demand table (FIG. 4) by processing in real-time all the discs in members' want lists and stored in the Want list table (FIG. 11). The goal of such processing is to remove discs which meet the following conditions:

1. All discs requested by members with a suspended account flag in the User Table (FIG. 6).
2. All discs requested by members with a canceled account flag in the User Table (FIG. 6).
3. All discs requested by members with a trade suspended flag in the User Table (FIG. 6). Trade suspended flags can be assigned to a member by administrators due to fraud concerns or by the billing system due to failed payment.
4. All discs requested by members with an invalid or missing credit card flag in the User Table (FIG. 6).
5. All discs requested by members with a vacation mode flag in the User Table (FIG. 6) indicating they do not wish to receive discs at this time.
6. All discs requested by members with a trade balance less than their min_balance.
    a) The member's trade credit balance is calculated from the User Score Table (FIG. 9) as follows: Shipping (total discs shipped) minus Receiving (discs sent to customer via trade) plus Bad_Receive (discs received in bad condition or never received);
    b) The min_balance is obtained from the Trade Limits Table (FIG. 10) based on their assigned limitid. The limitid is assigned to the member based on their trading history (see Risk Assessment Score).

This method is invoked any time on the following conditions occurs thereby yielding real-time tradeable demand in the system:

1. Member's suspended flag is removed;
2. Member's canceled flag is removed;
3. Member's trade suspended flag is removed;
4. Member's credit card is successfully updated;
5. Member's vacation flag is removed;
6. Member's trade balance changes due to trade activity including Shipping a disc via trade, Receiving a disc via trade, Confirming a disc received via trade, or when a previously Shipped disc via trade by the member is confirmed by the receiving member;
7. Member's Trade Limits change due to a change in the limitid assignment Method for Filtering Tradeable Inventory The administration computer generates a list of tradeable owned discs and stores them in the Inventory table (FIG. 5) by processing in real-time all the discs in members' have lists which are stored in the Have List table (FIG. 12). The goal of such processing is to remove discs which meet the following conditions 1. All discs owned by members with a suspended account flag in the User Table (FIG. 6).
2. All discs owned by members with a canceled account flag in the User Table (FIG. 6).
3. All discs owned by members with a trade suspended flag in the User Table (FIG. 6). Trade suspended flags can be assigned to a member by administrators due to fraud concerns or by the billing system due to failed payment.
4. All discs owned by members with an invalid or missing credit card flag in the User Table (FIG. 6).
5. All discs owned by members with a vacation mode flag in the User Table (FIG. 6) indicating they do not wish to receive discs at this time.
6. All discs with a keep it flag in the status field in the Have List Table (FIG. 12)
7. All discs owned by members with a trade balance greater than their max_balance value allowed.
    a. The member's trade credit balance is calculated from the User Score Table (FIG. 9) as follows: Shipping (total discs shipped) minus Receiving (discs sent to customer via trade) plus Bad_Receive (discs received in bad condition or never received);
    b. The max_balance is obtained from the Trade Limits Table (FIG. 10) based on their assigned limitid. The limitid is assigned to the member based on their trading history (see Risk Score Algorithm).
8. All discs owned by members with an Intransit value greater than their max_outbound value allowed.
    a. The member's Intransit value is calculated from the User Score Table (FIG. 9) as follows: Shipping (total discs shipped) minus Good_Ship (discs sent to customer via trade and confirmed as received in good condition) minus Bad_Ship (discs sent to customer via trade and confirmed as received in bad condition or never received);
    b. The max_outbound value is obtained from the Trade Limits Table (FIG. 10) based on their assigned limitid. The limitid is assigned to the member based on their trading history (see Risk Score Algorithm).

This method is invoked any time on the following conditions occurs thereby yielding real-time tradeable demand in the system:

1. Member's suspended flag is removed;
2. Member's canceled flag is removed;
3. Member's trade suspended flag is removed;
4. Member's credit card is successfully updated;
5. Member's vacation flag is removed;
6. Member changes the keep it flag associated with a disc;
7. Member's trade balance changes due to trade activity including Shipping a disc via trade, Receiving a disc via trade, Confirming a disc received via trade, or when a previously Shipped disc via trade by the member is confirmed by the receiving member;

8. Member's Trade Limits change due to a change in their limitid assignment

Method for Notifying Owners of Matched, Tradeable Discs

The administration computer generates notifications to the owners of tradeable discs in the Inventory Table (FIG. 5) which are matched with tradeable discs in the Demand Table (FIG. 4) as follows:

1. Administration computer generates a list of distinct disc ids from the Demand Table (FIG. 4). Each disc id is identified as a cover art only or cover art optional based on the following:
    a. If at least one of the discs for a given disc id has a cover art optional attribute in the status field in the Demand table, the disc id is identified as cover art optional.
    b. If all the discs for a given disc id have a cover art required attribute in the status field in the Demand table, the disc id is identified as cover art required.
2. When a member logs in or checks their Have List, the administration computer matches:
    a. The list of distinct disc ids in the Demand Table identified as cover art optional is compared with the member's disc ids in the Inventory Table (FIG. 5). Any disc matched is flagged to the member as a tradeable disc and listed under their requested discs list.
    b. The list of distinct disc ids in the Demand Table identified as covert art only is compared with the member's disc ids in the Inventory Table (FIG. 5) which have the cover art available attribute in the status field. Any disc matched is flagged to the member as a tradeable disc and listed under their requested discs list.
3. Periodically (e.g., every 8 hours), the administrator computer executes a batch to identify matches between discs in the Demand Table and discs in the Inventory Table and emails the owners of matched discs. The batch accounts for cover art preferences and availability as specified in 2 above.

Method for Posting Executed Trades

Once the receiver is selected for a trade by means of the priority algorithm, the administrator computer will perform the following to post the trade:

1. Provide the Owner of the disc with the Receiver's current mailing address from the Address Table (FIG. 7)
2. Send an electronic message to the Owner of the disc with confirmation of the trade using the contact information in the User Table (FIG. 6)
3. Send an electronic message to the Receiver of the disc with confirmation of the trade using the contact information in the User Table (FIG. 6)
4. Create a row in the Shipping Table (FIG. 13) for the executed trade with a pending status until confirmed by the receiver.
5. Update the shipper trade credit balance by incrementing the shipping field by one in the User Score Table (FIG. 9)
6. Update the receiver trade credit balance by incrementing the receiving field by one in the User Score Table (FIG. 9)
7. Deletes the entry for the shipper's disc from the Have List Table (FIG. 12) and the Inventory Table (FIG. 5.)
8. Deletes the entry for the receiver's disc from the Want List Table (FIG. 11) and the Demand Table (FIG. 4)

Method for Handling Trade Confirmation

The receiver of a disc via trade is presented with a trade confirmation page to report the outcome of the trade. The administrator computer updates the shipper's and receiver's trade credit balance based on reports submitted by the receiver of the disc. The trade credit balance is updated by making the following changes in the User Score Table upon confirmation by the receiver:

1. If the receiver reports that disc was received in good condition,
    a. The trade credit balance for the receiver is updated by incrementing by one the good_receiver value for the receiver in the User Score Table
    b. The trade credit balance for the shipper is updated by incrementing by one the good_ship value for the shipper in the User Score Table
    c. Updates the receive condition for the trade in the Shipping Table to create a billable event for the receiver
    d. Adds a row for the disc for the receiver in the Have List Table (FIG. 12)
2. If the receiver reports that the disc was never received or was received in bad condition or was the wrong disc received
    a. The trade credit balance for the receiver is updated by incrementing by one the bad_receiver value for the receiver in the User Score Table
    b. The trade credit balance for the shipper is updated by incrementing by one the bad_ship value for the shipper in the User Score Table
    c. Adds a row for the disc for the receiver in the Want List Table (FIG. 11) so the disc can be received via another trade
3. If the receiver does not submit a report within x days after the trade was initiated (e.g., 14 days), the administrator computer will contact the receiver electronically to request a confirmation.
4. If the receiver does not submit a report within y days after the trade was initiated (e.g., 21 days), the administrator computer automatically confirm the trade as received in good condition and,
    a. The trade credit balance for the receiver is updated by incrementing by one the good_receiver value for the receiver in the User Score Table
    b. The trade credit balance for the shipper is updated by incrementing by one the good_ship value for the shipper in the User Score Table
    c. Updates the receive condition for the trade in the Shipping Table to create a billable event for the receiver
    d. Adds a row for the disc for the receiver in the Have List Table (FIG. 12)

III. PRIORITY SCHEMES

A. Overview of Priority Schemes

In one preferred embodiment of the present invention, each article has a quality score that is a function of the current demand for the article to the current supply of the article among the members. Each member has an account that includes a trading credit balance that reflects the difference between the number of articles that the member previously owned and traded to other members and the number of articles that were sent to the member by other members. Each account also includes a quality balance score. The quality balance score is the sum of the articles previously sent by the member that had a quality score greater than the quality score of the article that the member currently wants to receive minus the sum of the articles previously received by the member that had a quality score greater than the quality score of the article that the member wants to receive. In this embodiment, the priority algorithm referred to above uses at least the trading credit balance and the quality balance score as factors in the algorithm to select the member who will receive the article.

In an alternative embodiment of a priority scheme, the members receive an overall priority that is not tied to a specific wanted article, and the overall priority is used as a factor in deciding the priority for receiving the specific wanted article. The member's priority is still calculated based upon supply/demand factors. For example, a supply/demand score for each article that a member ships (at the time that the member ships it) may be compared to an average supply/demand score for all articles (at the time that the member ships it) to obtain a supply/demand score ratio, and a running average of the supply/demand score ratio may be used as a factor in calculating the priority.

Other factors that may be used in the priority algorithm include a distance between mailing addresses of identified matching members and the amount of time since a member last received an article. For example, it is preferable to ship articles to members who are close to each other so as to reduce delivery time and thereby increase user satisfaction with the trading process. Likewise, it is preferable to give priority to members who have the longest time span since the previous delivery. Different weightings may be assigned to each of the factors discussed above.

Various combinations and permutations of these priority schemes may be used. The supply/demand calculations may be based upon supply/demand among the members or a marketplace supply/demand calculation. One advantage of the priority schemes described herein is that they simplify the trading process by allowing for one-to-one trading, while still rewarding members who trade popular articles with a valuable benefit, namely, increased speed and likelihood of receiving wanted articles from other members.

B. Detailed Disclosure of Priority Schemes

Priority Algorithm and Quality Score and Risk Assessment Score If the owner of a disc agrees to ship a disc with two or more members requesting the disc in the Demand Table (FIG. 4), the administrator computer selects a member to receive the disc as follows:

1. A priority score for the disc in question is computed for each member requesting the CD as follows:

Priority Score for Member($i$) for $Disc(j)$ = [Predetermined WeightFactor×

Trading Credit Balance for Member($i$)] +

[Predetermined WeightFactor× Quality Balance Score($j$)

for Member($i$)] + [Predetermined WeightFactor×

Days Since Last receive score for

Member($i$)] + [Predetermined Weight Factor ×

Distance in miles between Member($i$) mailing address andthe owner of disc($j$) mailing address]

2. Selecting the member with the highest priority score to receive the disc in question. Trading Credit Balance is calculated from the User Score Table (FIG. 9) as follows:

Shipping (total discs shipped by member via trade)
minus Receiving (total discs received by member
via trade)+Bad_Receive (discs received in bad
condition or never received);

Quality Balance Score(j) is equal to:

[Σ discs shipped by member($i$) with a Quality Score at
time of trade>=Quality Score disco)] minus [Σ
discs received in good condition by member($i$)
with Quality Score at time of trade>=Quality
Score for disc($j$)]

Where Quality Score for disc(x) is a function of the total demand in the Demand Table for disc x and the total inventory in the Inventory Table for disc x.

As example, the Function to determine the Quality Score for disc(x) could be computed as:
If Total Inventory for disc(x)>=1, Quality Score for disc($x$)=[Total Demand for
disc($x$)]$^2$÷[Total Inventory for disc($x$)]

Else,

Quality Score for disc($x$)=[Total Demand for disc($x$)]

The Risk Assessment Score

The Risk Assessment Score is computed as a function of the number of trades executed by the member and the ratio of good trades to total trades. The User Score Table is used to compute the Risk Assessment Score.

For example, the Risk Assessment Score can be derived from User Score Table as follows:

[WeightFactor($i$)]×[Good_Ship]+[WeightFactor($j$)]×
[(Good_Ship)÷(Good_Ship+Bad_Ship)]

For each Risk Assessment Score or range of scores, the administration computer assigns members to a unique LimitID in the Trade Limits Table (FIG. 10). Each LimitID has been pre-assigned with certain trading limit values that correspond to assessed levels of risk for trade. For example, FIG. 26 shows a table that can be used to interpret the use of Risk Assessment Scores, LimitIDs, and Trading Limits.

IV. ARTIST CONTRIBUTION FOR TRADED ARTICLES

A. Overview of Artist Contribution for Traded Articles

The first-sale doctrine is a limitation upon copyright that is codified in the Copyright Act of 1976, 17 U.S.C. §109. The doctrine of first sale allows the purchaser to transfer (i.e., sell or give away) a particular, lawfully made copy of the protected work without permission once it has been obtained. That means the distribution rights of a copyright holder end on that particular copy once the copy is sold. Accordingly, when used articles, such as musical recordings on albums or CDs, books and the like, are resold, neither the artists who created the content of the articles, nor any entities that marketed, manufactured or distributed the articles, receive any additional revenue as a result of the sale of the used articles. Used articles usually sell for less than new articles. A certain percentage of consumers who are interested in the article will purchase a used article instead of a new article so as to save money, thereby reducing revenue earned by the artists and their marketing partners. The artists and their marketing partners typically cannot compensate for the used sales by raising the original price of the articles because the marketplace typically sets the price for new articles. Furthermore, the marketability of used articles has increased dramatically since content on digital media is smaller and more compact, and less likely to degrade than recordable media forms such as albums (vinyl) and cassette tape that were previously used.

One ramification of this situation is that so-called "struggling artists" have to struggle even harder to earn revenue. Another ramification is that some content creators and their marketing partners are starting to develop complicated schemes to restrict or prevent reuse of content by anybody other than the original purchasers. These schemes are generally not well-received by consumers who believe that they should be able to resell used articles. The impacts on the struggling artists and the developing conflicts between content creators and their marketing partners and consumers could potentially be reduced if the content creators and their marketing partners could receive additional revenue from trades and sales of their used articles.

In one preferred embodiment of the present invention, one or more pools of funds are created for distribution to a plurality of content creators who produce content that is sold to individuals in the form of an article. The trading scheme described above is used as the platform for the creation of the pool(s) of funds. In one scheme, the administration computer automatically allocates a portion of each trading fee to be placed in the pool(s) of funds for distribution to the plurality of content creators. Preferably, the administration computer records data for each trade, including the content creator associated with each traded article, and then allocates the pool of funds to individual content creators in proportion to the trades related to articles produced by the respective content creators. However, other types of allocation schemes are within the scope of the present invention. A user interface may be provided that allows content creators to register with the administration computer and set up content creator accounts to allow funds to be transferred from the pool of funds to respective content creator accounts. The portion of the trading fee may be a predetermined fixed amount or a predetermined percentage of each trading fee, such as about 20% of the trading fee.

In an alternative embodiment, one or more of the pools of funds are distributed to a plurality of entities that market, manufacture or distribute content that is sold to individuals in the form of an article, and the administration computer automatically allocates a portion of each trading fee to be placed in the pool(s) for distribution to the plurality of entities. That is, content creators and/or their marketing partners can be compensated for used sales of their articles.

The amount of funds placed in the pool(s) does not necessarily have to be amount associated with a trading fee. Instead, the amount may be placed in the pool(s) for every trade, regardless of whether or not a trading fee is incurred. The amount may simply be a fixed amount or fixed percentage of some benchmark that is unrelated to any trading fee. This scheme may be used for trading sites that do not charge trading fees or for trading sites that charge trading fees but wish to compensate content creators and/or their marketing partners separate from any trading fee accounting process.

Furthermore, the artist contribution scheme need not be limited to trading sites and is equally applicable to any store (either bricks-and-mortar or internet-based (e.g., website)) that sells or brokers used articles. In this embodiment, an administration computer automatically allocates an amount to be placed in the at least one pool of funds for distribution to the plurality of content creators for each purchase made of a previously sold article. In this embodiment, the administration computer primarily functions to maintain inventory of articles for sale, instead of, or in addition to, articles for trade, but shares the capabilities described above for tracking funds to be distributed to content creators and their marketing partners.

B. Detailed Disclosure of Artist Contribution for Traded Articles

Figure 27:
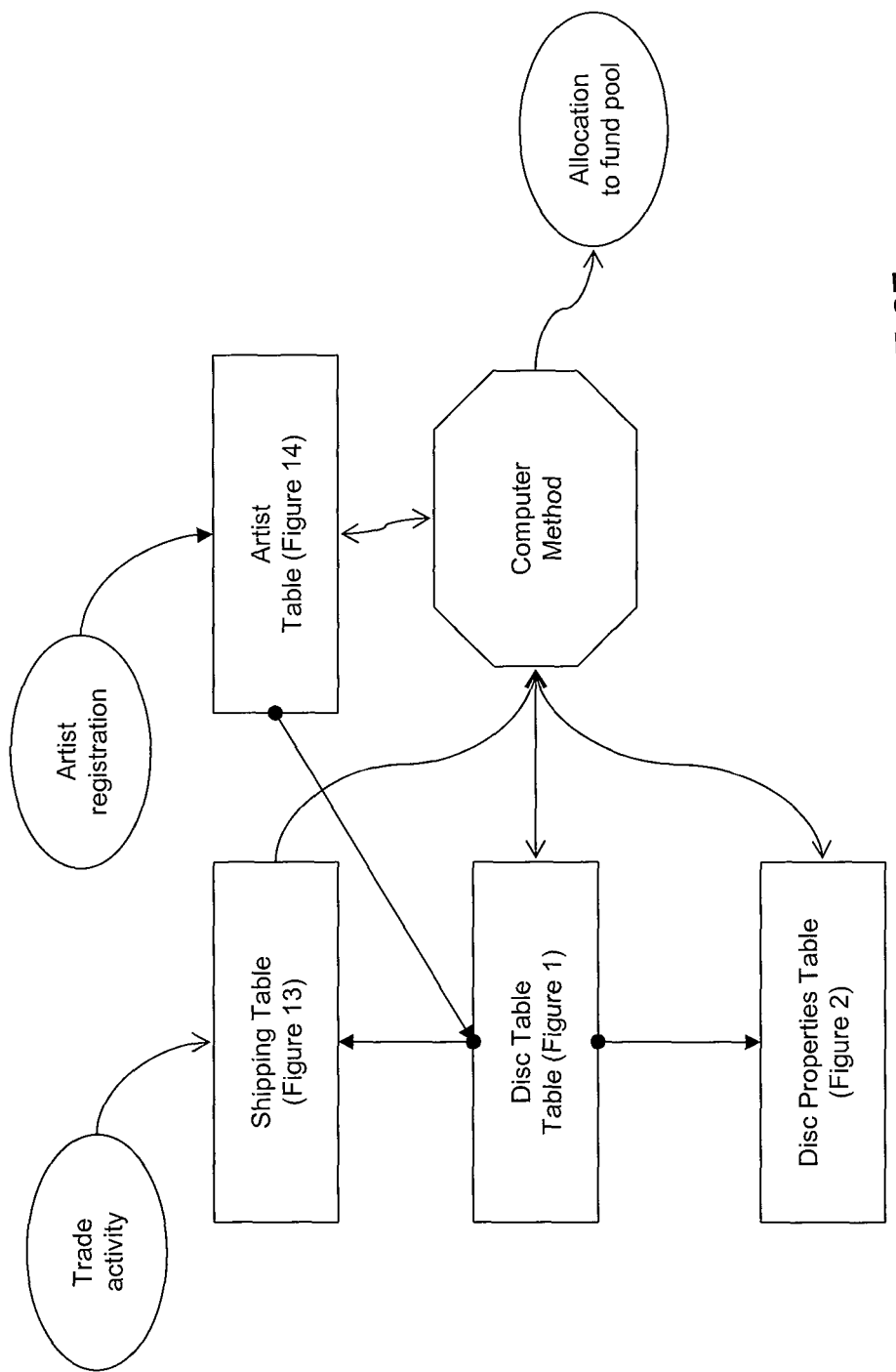
FIG. 27 is a combination flowchart/entity relationship diagram associated with an artist contribution process.
Figure 28:
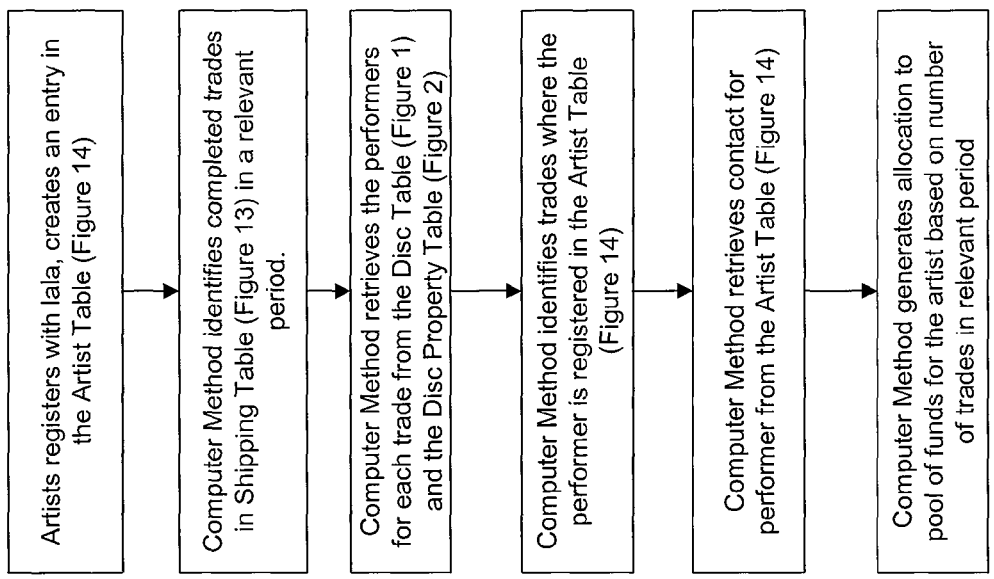
FIG. 28 is a flowchart of the artist contribution process.

FIG. 27 is a combination flowchart/entity relationship diagram, and FIG. 28 is a flowchart for the artist contribution process.

V. COMMUNITY SHARING OF MEMBER INTERESTS AND SEARCHING METHODOLOGIES FOR FACILITATING THE SHARING OF MEMBER INTERESTS

A. Overview of Sharing of Member Interests and Searching Methodologies for Facilitating the Sharing of Member Interests As described above, one preferred embodiment of the present invention provides a community of members who can trade music recordings. To facilitate a sense of community among the members, members are permitted to view music interest data of other members. Music interest data includes music recordings that each member listens to, articles of music recordings (e.g., CDs) that each member owns and is willing to trade, and articles of music recordings (e.g., CDs) that each member wants to own. To encourage sharing of music interest data, the administration computer automatically identifies other members who have similar music interest data with a specific member. The identities of the other members are then automatically displayed to a member when the member logs into the community. For example, the identities of the eight most similar members are shown. The member can then navigate directly to the music interest data of any of the similar members and view the music recordings that the other member listens to, owns and wants to own. By viewing such data, members may learn of music recordings that the member may not have otherwise considered owning. In turn, this may encourage the member to add certain music recordings to the member's list of wanted music recordings. The global effect of this sharing process is to increase the overall level of trading activity among the members and strengthen member affinity to the community.

A similar experience may occur as a result of a search process by a member. Members are provided with a search function that allows the member to search for music recordings by keyword, or by artist, album, song, member or the like. The search is processed by a search engine and results are returned and displayed to the member. In addition to the search results, for certain types of searches, the member is shown the identities of other members who have similar music interest data as the search request. Some examples are as follows:

1. Search input is "Jay Farrar." Eight member identities are shown who have a similar interest in Jay Farrar, as determined from one or more of the music interest data.

2. Search input is "rhythm." Eight member identities are shown who have a similar interest in rhythm music, as determined from one or more of the music interest data.

In one preferred embodiment of the present invention, identities of members in a common community of registered members who have similar interests in music recordings are displayed to other members. The members can trade articles containing music recordings with each other. An administration computer maintains music interest data of members including music recordings that each member listens to, articles containing music recordings that each member owns, and articles containing music recordings that each member wants to own. The administration computer applies a distance function to at least some of the music interest data to determine how similar the music interests of a member is to the music interests of other members. The identities of a predetermined number of other members who are determined to have similar music interests as the member are displayed to the member via a user interface. The member may then navigate to a display of at least some of another member's music interests by selecting the member's identity displayed on the user interface. In one scheme, all of the music interest data (i.e., listened to music, owns and wants) is used as factors in the distance function and all of another member's music interest data is displayed.

In another preferred embodiment, the user interface further allows members to enter searches for articles containing music recordings or properties of articles containing music recordings, and the determination of similar music interests is made using the search entry.

In another preferred embodiment of the present invention, identities of members are displayed who have similar sets of articles as other members in a common community of registered members. The common community allows members to list articles that members own and articles that members want to own and to trade articles among each other. An administration computer maintains data of articles that each member owns and articles that each member wants to own. The administration computer uses at least some of the article data to determine for a member how similar the other members' sets of articles are to the set of articles owned by the member. In one preferred scheme, a distance function is used for the similarity determination. The identities of a predetermined number of other members who are determined to have similar sets of articles as the member are displayed to a particular member. The member can then navigate to a display of another member's list of articles by selecting the member's identity, such as via a hyperlink. In one scheme, the identities of the other members are automatically displayed when the member logs into the community. The determination for each member of how similar the other members' sets of articles are to the set of articles owned by the member is made by comparing to only the lists of articles that the members own, or by comparing only the lists of articles that the members want, or by comparing the list of articles that the members own and the list of articles that the members want. Other permutations of comparisons are within the scope of the invention, such as comparing the list of articles that a member wants to the list of articles that other members own and want.

In yet another more generic embodiment, article interest search data, which may be an article or a property of an article, is entered by a member and the similarity determination is made between the entered article interest search data and article interest data of the other members (e.g., articles that each member owns, and articles that each member wants to own). In one scheme, all of the articles are of the same type (e.g., all music recordings on CDs). In another scheme, the articles are of different types (e.g., music recordings on CDs, video recordings on DVDs, books).

Although a specific distance function is described in detail below, the scope of the present invention includes other types of distance functions, as well as other algorithmic techniques for determining the similarity of one set of data to another set of data.

Figure 29:
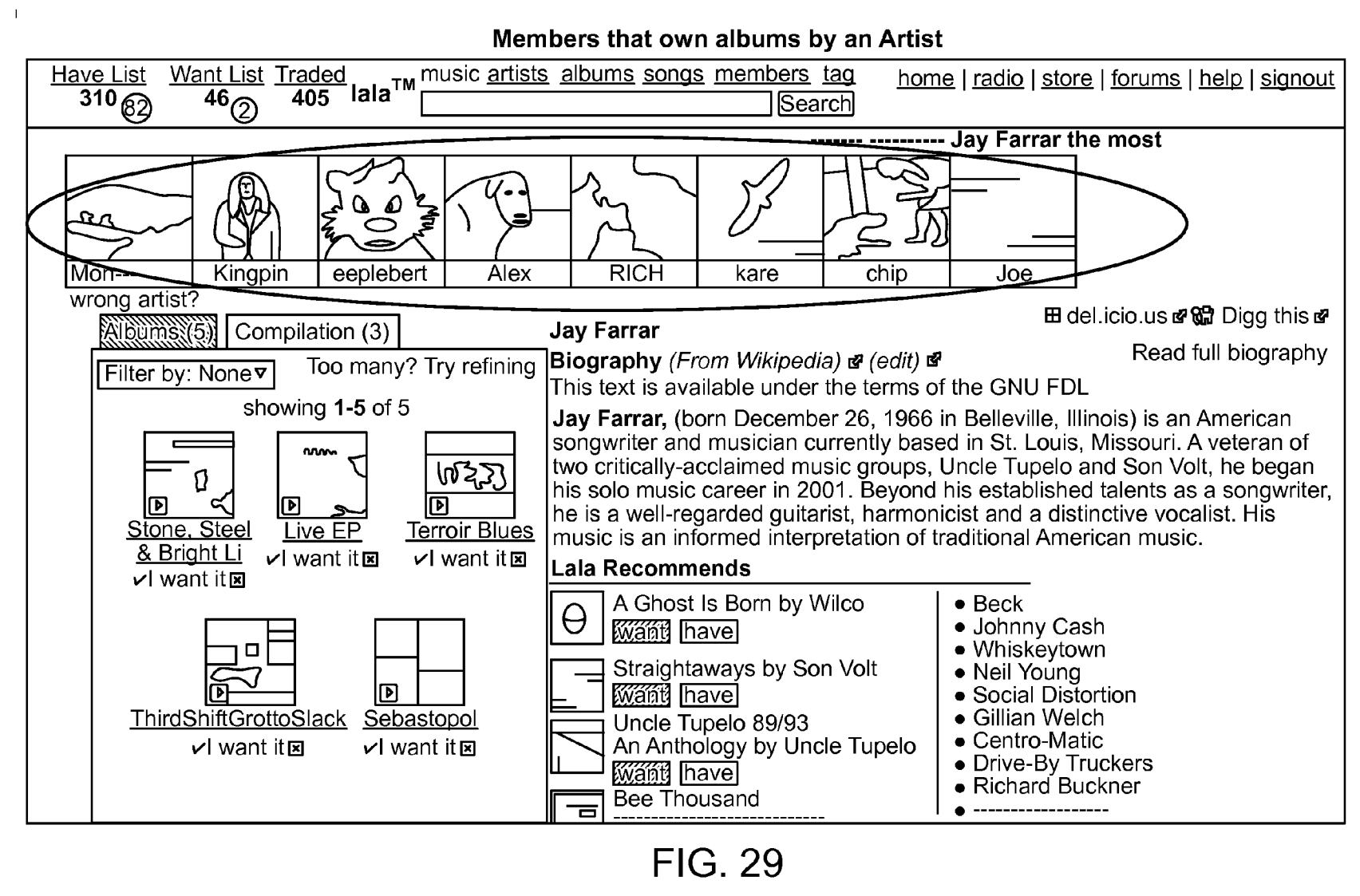
Figure 31:
Figure 31:
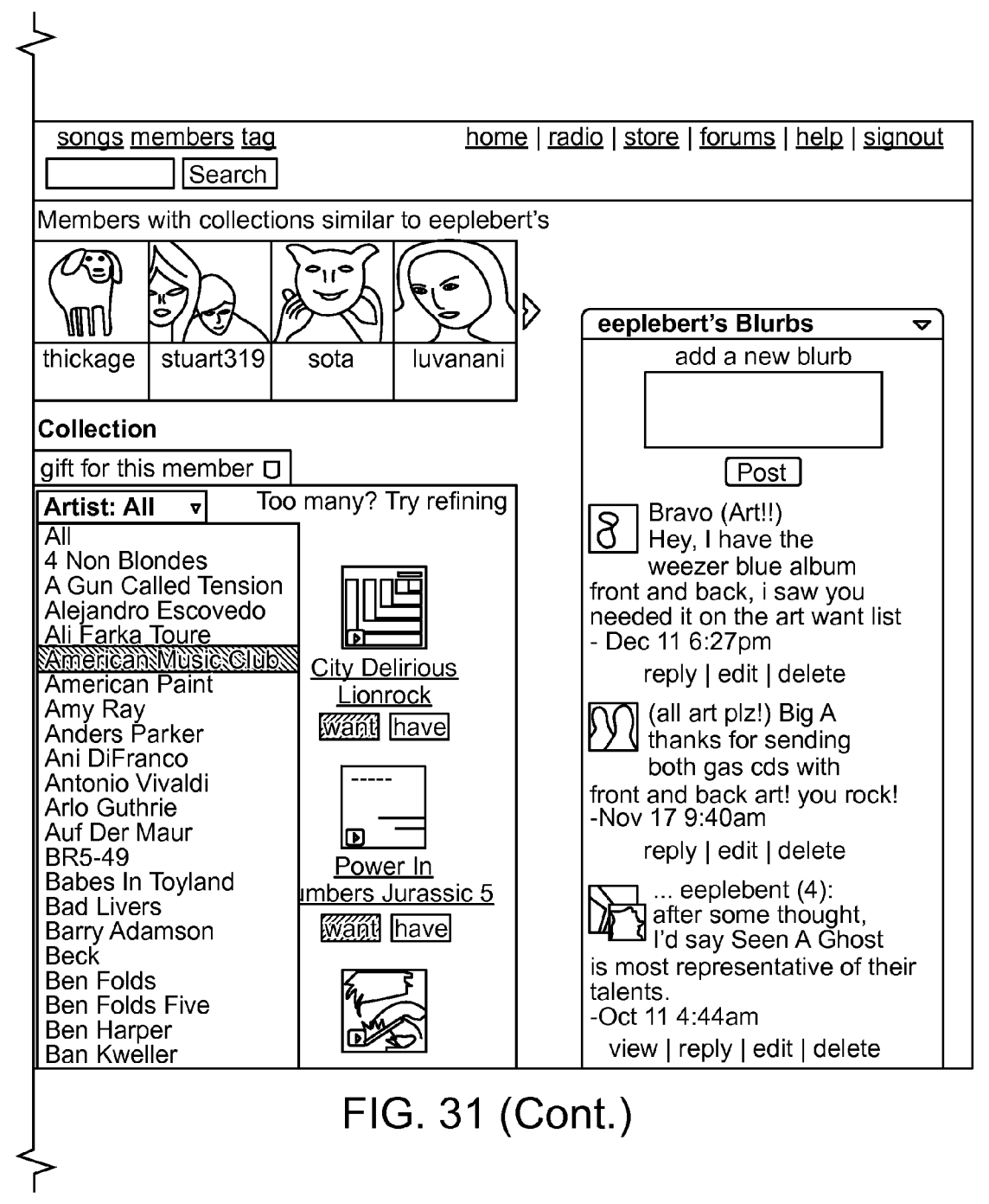

B. Detailed Disclosure of Sharing of Member Interests and Searching Methodologies for Facilitating the Sharing of Member Interests FIGS. 29-33 are display screens that show how members can share their interests with other members. For example, FIG. 29 shows the resultant display screen for a search of the artist "Jay Farrar." An upper region of the display screen marked with an oval for convenience includes icons of the identities of eight other members who like Jay Farrar the most, as determined by a similarity algorithm. If desired, a member can then click on one of the identities and view the CD collection of that member, as shown in FIG. 30. Filtering options can be used to narrow down the collection to a subset that matches the filtering options, as shown in FIG. 31.

Figure 32:
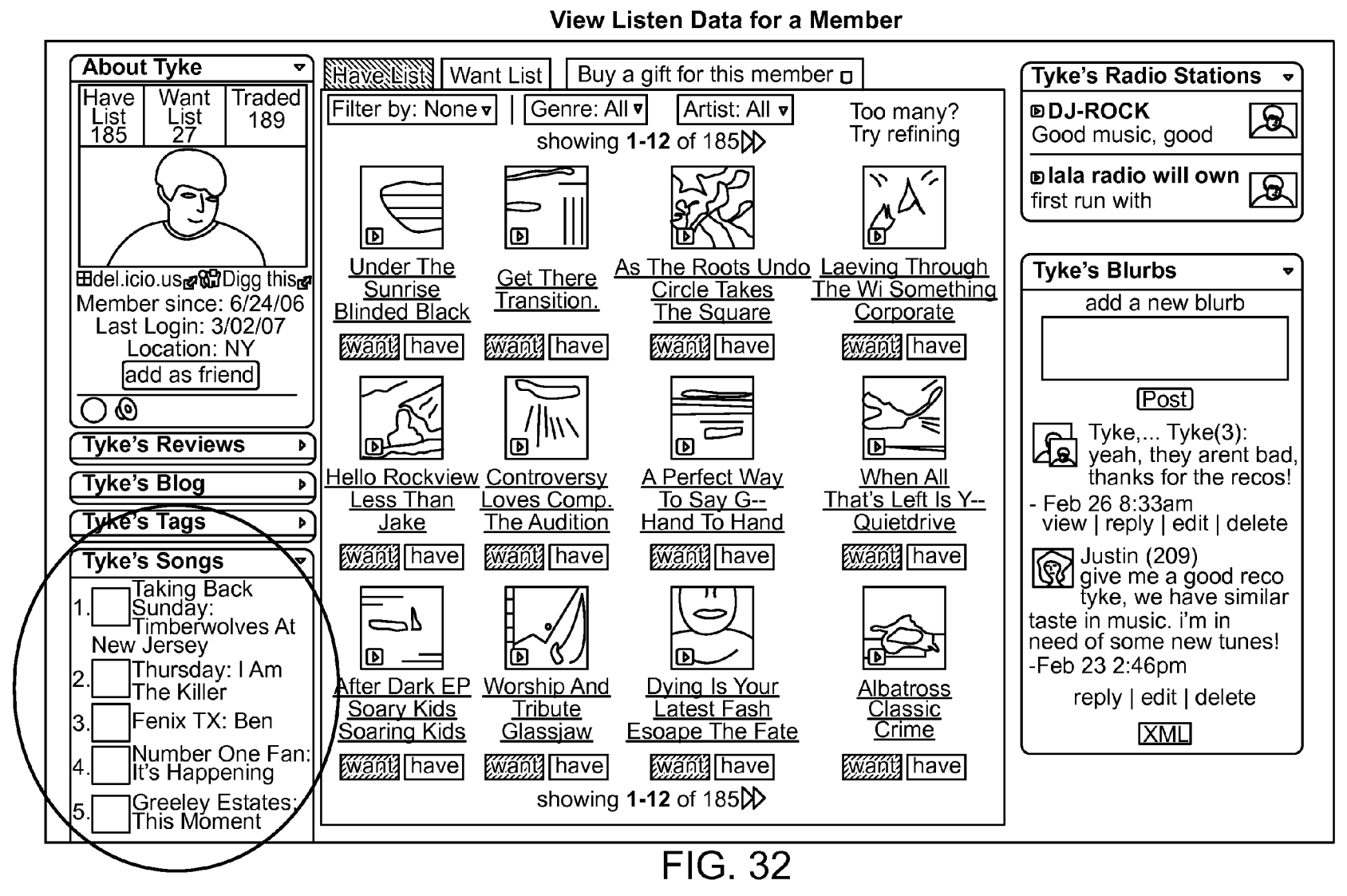
Figure 33:
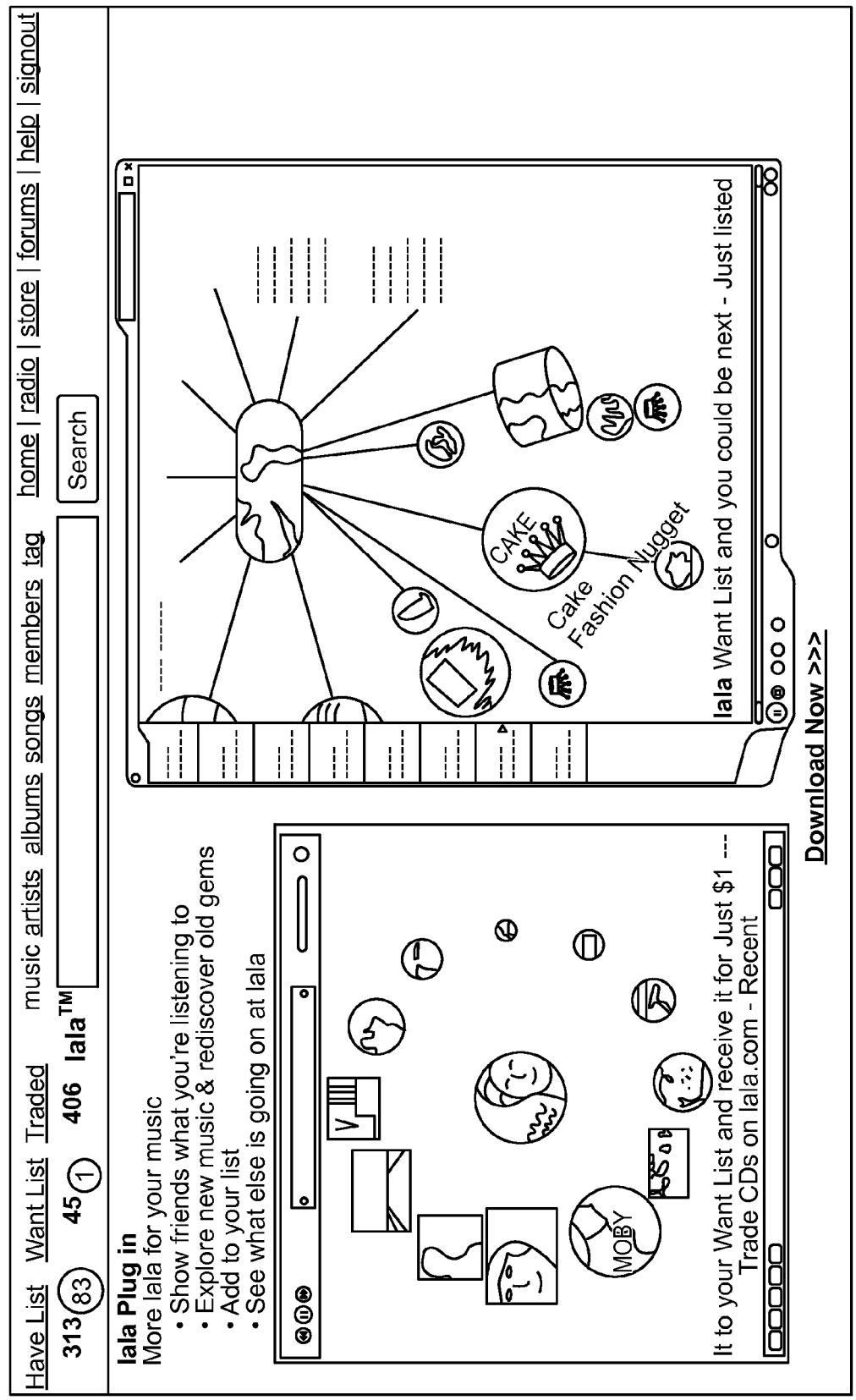

In one embodiment of the present invention, members can view "listen data" of other members, as shown in FIG. 32. The listen data may be the listen data associated with one of the members located in a search, or the listen data may be the listen data shown for one of the members displayed in FIG. 16 whose collections are similar. In one preferred embodiment of the present invention, the listen data is collected automatically by a software plug-in that keeps track of any music that is played from the user's computer and/or any music that is downloaded into a portable music player, such as an MP3 player or iPod®. FIG. 33 shows a listen plugin download screen display.

Plug-ins for tracking listened to music are well-known, and any known plug-in is suitable to enable this feature. One commercially available plug-in that is suitable for this function is a plugin for the "Yahoo Music Engine,", commercially available as a free download from Yahoo!® Inc.

Figure 34:
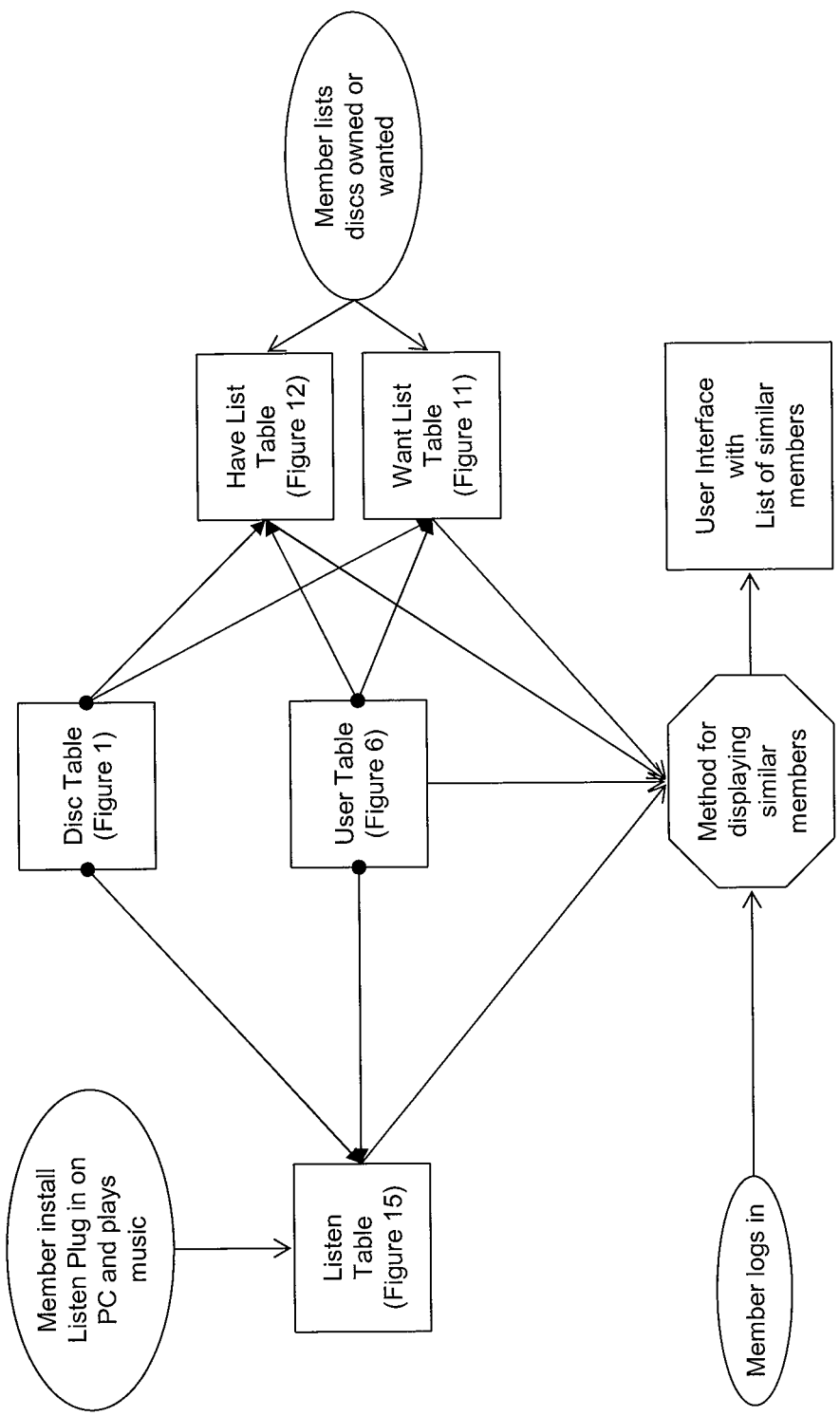
FIG. 34 shows a combination flowchart/entity relationship diagram related to the sharing process.

FIG. 34 shows a combination flowchart/entity relationship diagram related to the sharing process.

Method for Selecting Members Similar to a User

A plurality of members logs in via the internet and browse discs listed in the Disc Table (FIG. 1).

Members add discs they want to their Want list Table (FIG. 11).

Member adds a number of discs owned to their Have List Table (FIG. 12).

A plurality of members logs in via the internet and installs the Listen Plugin on their PC. As music is played, the Listen Plugin collects listen data and uploads to the Listen Table (FIG. 15). If the member listens on their portable device and then synchronizes with their PC, any listen data reported by the device is also collected and uploaded to the Listen Table.

User X subsequently logs in via the internet and clicks on their personal home page. The administration computer then invokes a method for retrieving a list of other members similar to User X.

The administration computer method relies on a Similarity Algorithm to determine a list of similar members to User X. The Similarity Algorithm is computed by using various distance functions between users of the community.

For example, when requested for members similar to a member A, the Similarity Algorithm applies the distance function across all members (A, X) and returns the first N members by distance ascending. The closer the distance to zero, the more similar the members are considered to be. Alternatively, the Similarity Algorithm can also use a "score" where the higher the score between two members the more similar they are.

An embodiment of the Similarity Algorithm can utilize the list of discs owned by user X to find similar members (It is important to note that the Similarity Algorithm could also utilize other articles such as the list of discs requested, or a list of music listened to):

1. The first distance function is the cardinal of the intersection between the discs owned by User X and the rest of the members in the community. This function is computed as follows:
    a. The administration computer utilizes User X unique identifiers, the userkey and the md5key from the User Table (FIG. 6), to retrieve the current list of discs owned by User X from the Have List Table.
    b. The administration computer then utilizes the list to compute a histogram from the Have List Table which yields one row per user in the Have List Table and the number of discs owned by each user which are also owned by User X.

c. The distance between User X and any of the members (e.g., User Y) is computed as follows:

Distance$(X,Y)=|A|-|A\text{ inter }B|$, where A is the total number of discs owned by User X, B is the total number of discs owned by User Y, and |A inter B| is the total number of discs owned by User Y also in List Y, obtained from the histogram in step (b).

2. A second distance function can also be used to address a drawback with the cardinal distance function where members with large collections of discs will be similar to everyone. The second distance function alleviates the issue by having the distance be the ratio of the size of the intersection by the average size of the each users owned disc list;

Distance$(A,B)=(|A|-|A\text{ inter }B|)\div(|A|+|B|)/2$; where A is the total number of discs owned by User X, B is the total number of discs owned by User B and |A inter B| is the total number of discs owned by User B and also in A, 3. A third distance is computed by computing the distance between the probability distribution of the users' listen list against a genre. The Kullback Leibler Distance (KL) is defined by:

$\Sigma(p*\log(p/q))$ for each genre

For example, if comparing user A and User B with the following probabilities of listen data in each genre:
User A: {genre1: 0.1, genre2: 0.4, genre3: 0.5}
User B: {genre1: 0.2, genre2: 0.3, genre3: 0, genre4: 0.5}

The *KL* value=$0.1*\log(0.1/0.2)+0.4*\log(0.4/0.3)+0.5*\log(0.5/0)+0*\log(0/0.5)$ 4. The Algorithm has the ability to use the most appropriate distance functions in a given context. The first two functions allow for very fine grain comparisons whereas the third provides more robust coarse grain comparisons.

5. The Algorithm can also take advantage of a user's most recent query and fine-tune the set of similar members based upon that additional information. When a member A performs a search for a certain artist S, the distance functions can be modified to increase the member's weight in that artist. In the first two distance functions, this may consist of just "adding" all or a subset of the discs by that artist to the member's collection (for the time of the similarity computation); Similarly the third distance function can be tuned by increasing the probability of the artist's genre in the member's listen table.

VI. PROCESS TO SUPPLY PACKAGING/SHIPPING MATERIALS

A. Overview of Process to Supply Packaging/Shipping Materials

In one preferred embodiment of the present invention, members are provided with postage-paid mailing envelopes and article cases so as to allow the members to mail articles that the members own to other members of the common community as part of the article trading process. The envelopes have no addressee printed thereon. The members are instructed by the administration computer as to who the addressee should be when a match is located. Although no postage for trades is paid when mailing envelopes and cases to members, there is still a cost to the administrating entity in purchasing, printing and mailing the envelopes and cases to the members. Accordingly, it is desirable to control the circulation of envelopes and cases so that the supply and demand of envelopes and cases is kept at a level where all members have a ready supply of envelopes and cases so that articles can be shipped immediately upon a match being identified, without incurring unnecessary costs by oversupplying such materials to the members.

To achieve this goal, the administration computer automatically outputs shipment orders to mail the envelopes to the members and the administration computer includes business logic rules for determining when to output the shipment order, the quantity of envelopes to ship, and whether to include cases in the shipment order. In one scheme, the administration computer sends an electronic message to a member upon the output of a shipment order related to the member requesting that the member respond to the electronic message by indicating whether the member wants an additional quantity of envelopes. In another scheme, the administration computer automatically mails the envelopes to the member based on the outputted shipment order. Predictive rules based upon at least a member's trading behavior may be used to determine when to output the shipment orders.

To further minimize unnecessary packaging costs, the user interface may optionally suppress icons and selection options that allow a member to request additional envelopes and cases if the administration computer determines based on member trading histories that the members should not need such materials. Alternatively, the ability to request additional envelopes and cases may be limited to certain quantities based on member trading histories. For new members, an initial shipment of mailers may occur once the user lists a predetermined number of articles (e.g., five CDs) that are available to trade, or if the member submits a credit card number to be maintained on file by the administration computer, regardless of whether any articles are listed as being available to trade.

B. Detailed Disclosure of Process to Supply Packaging/Shipping Materials

Figure 35:
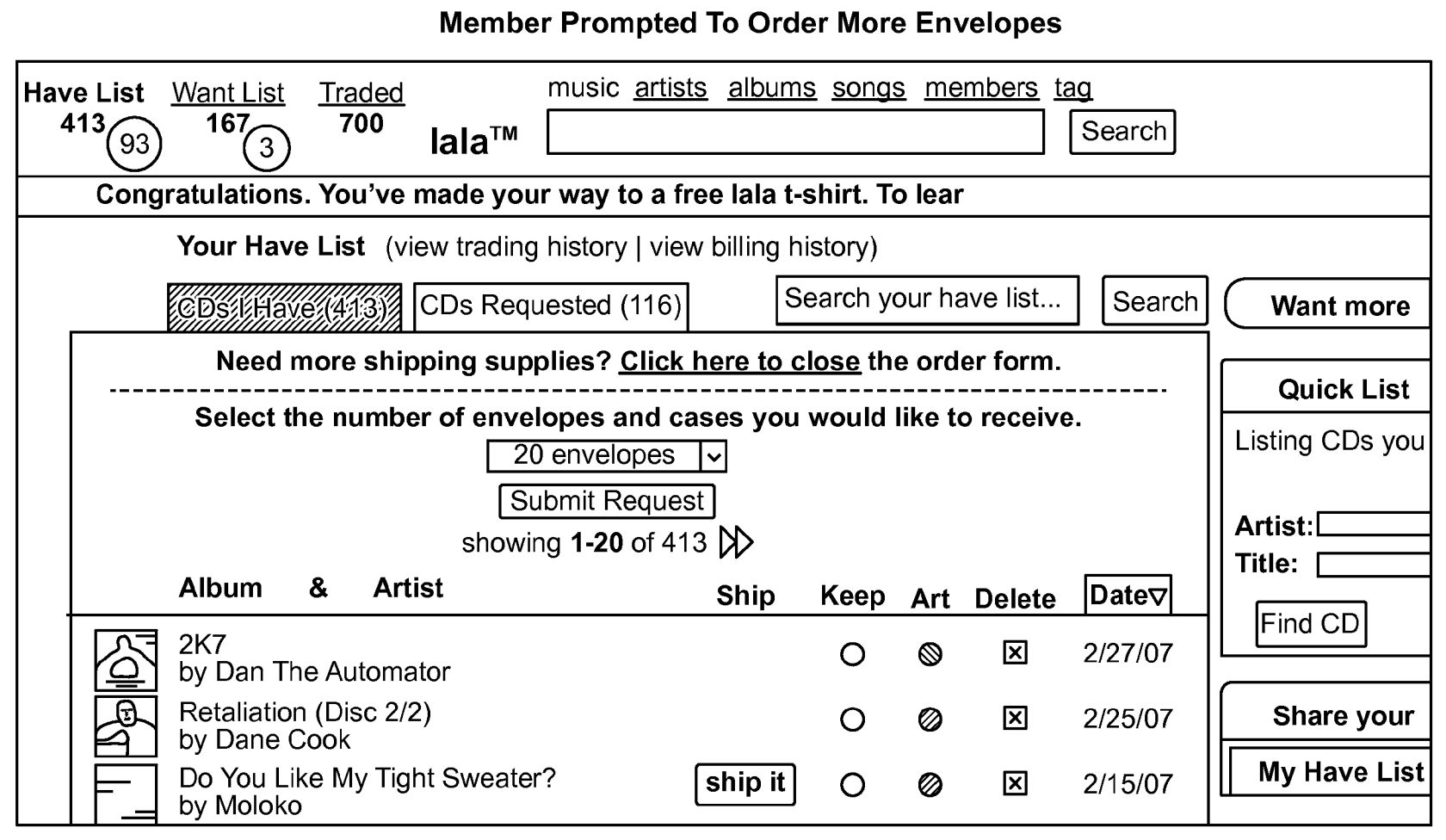
Figure 36:
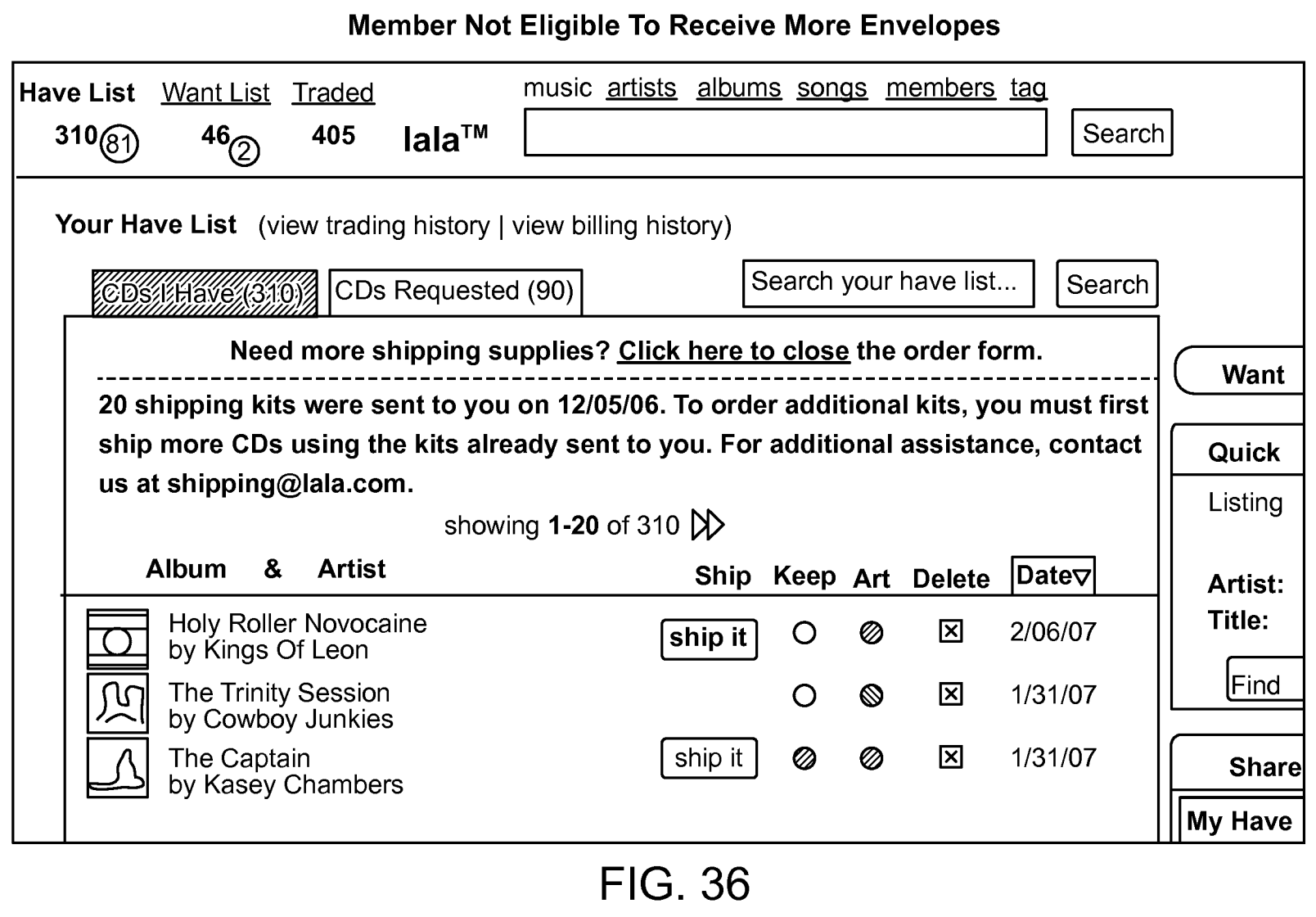

FIGS. 35 and 36 are screen displays related to an envelope supplying process. FIG. 35 shows the screen display when a member is prompted to order more envelopes. FIG. 36 shows a screen display that informs the member that they are not eligible to receive more envelopes at the current time.

Figure 37:
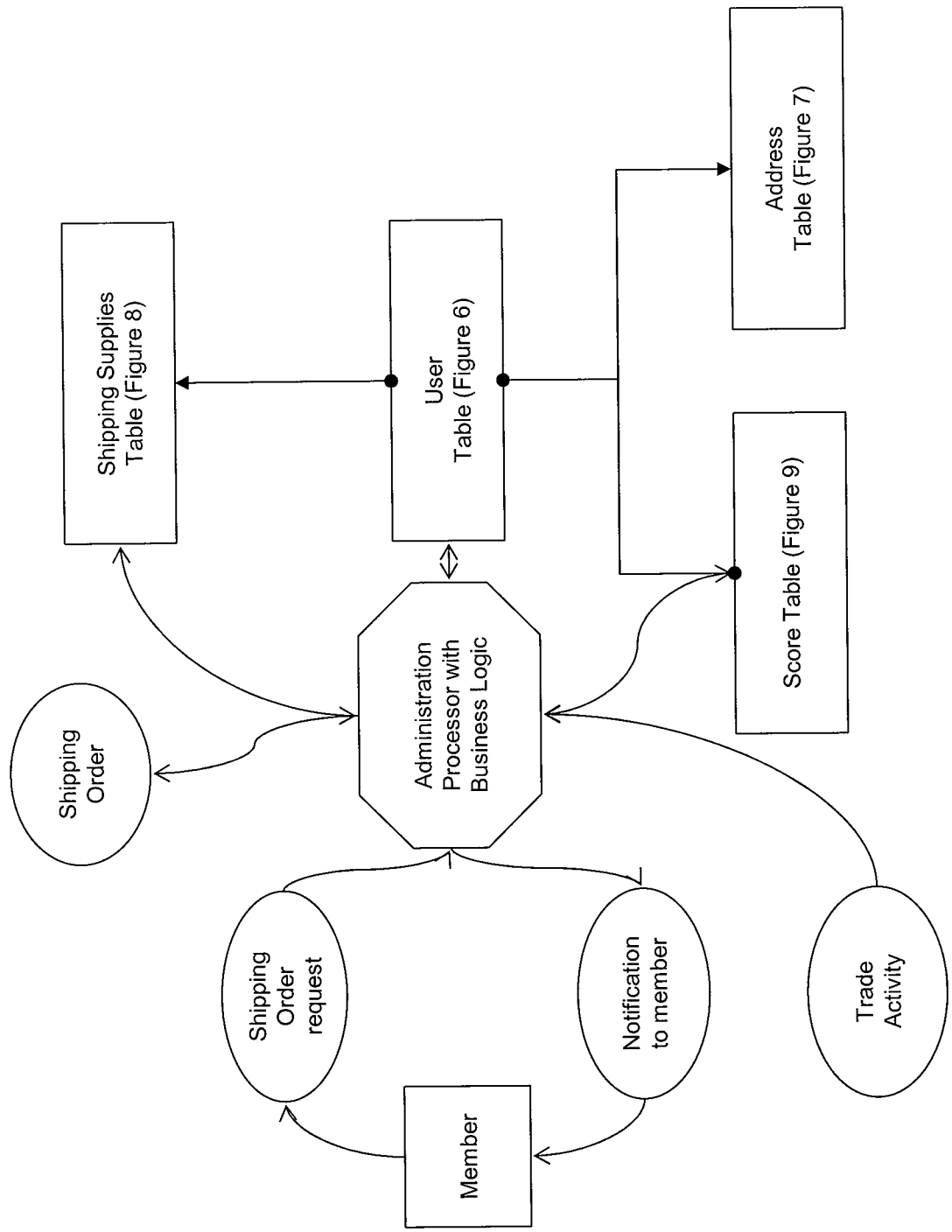
FIG. 37 shows a combination flowchart/entity relationship diagram related to the envelope supplying process.
Figure 38:
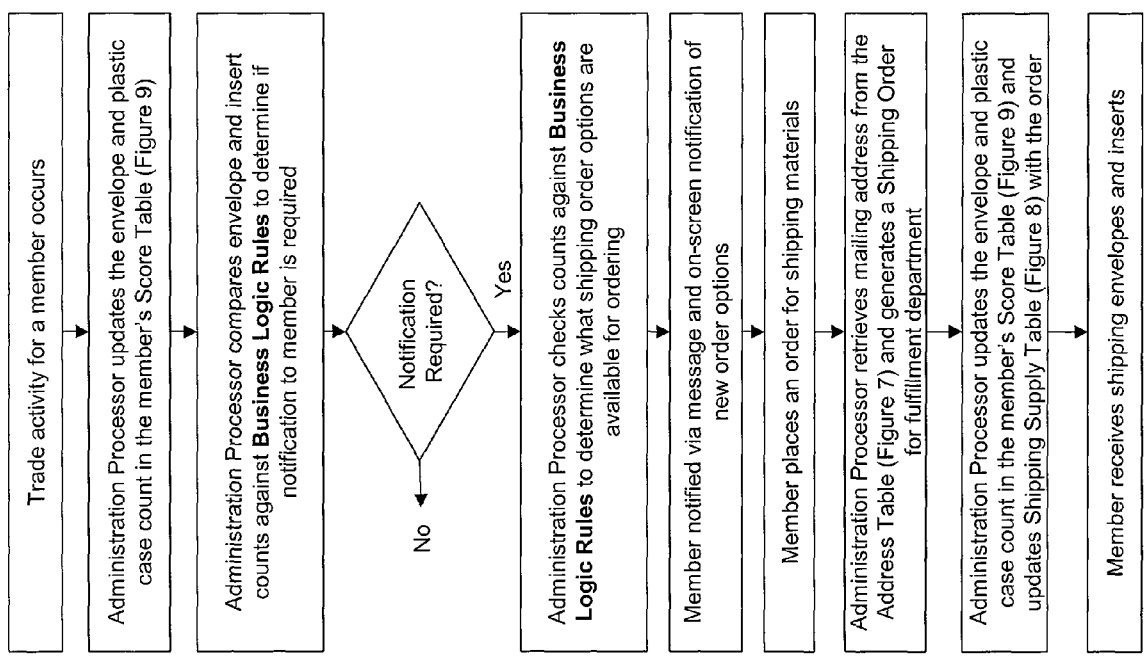
FIG. 38 shows a flowchart related to the envelope supplying process.
Figure 39:
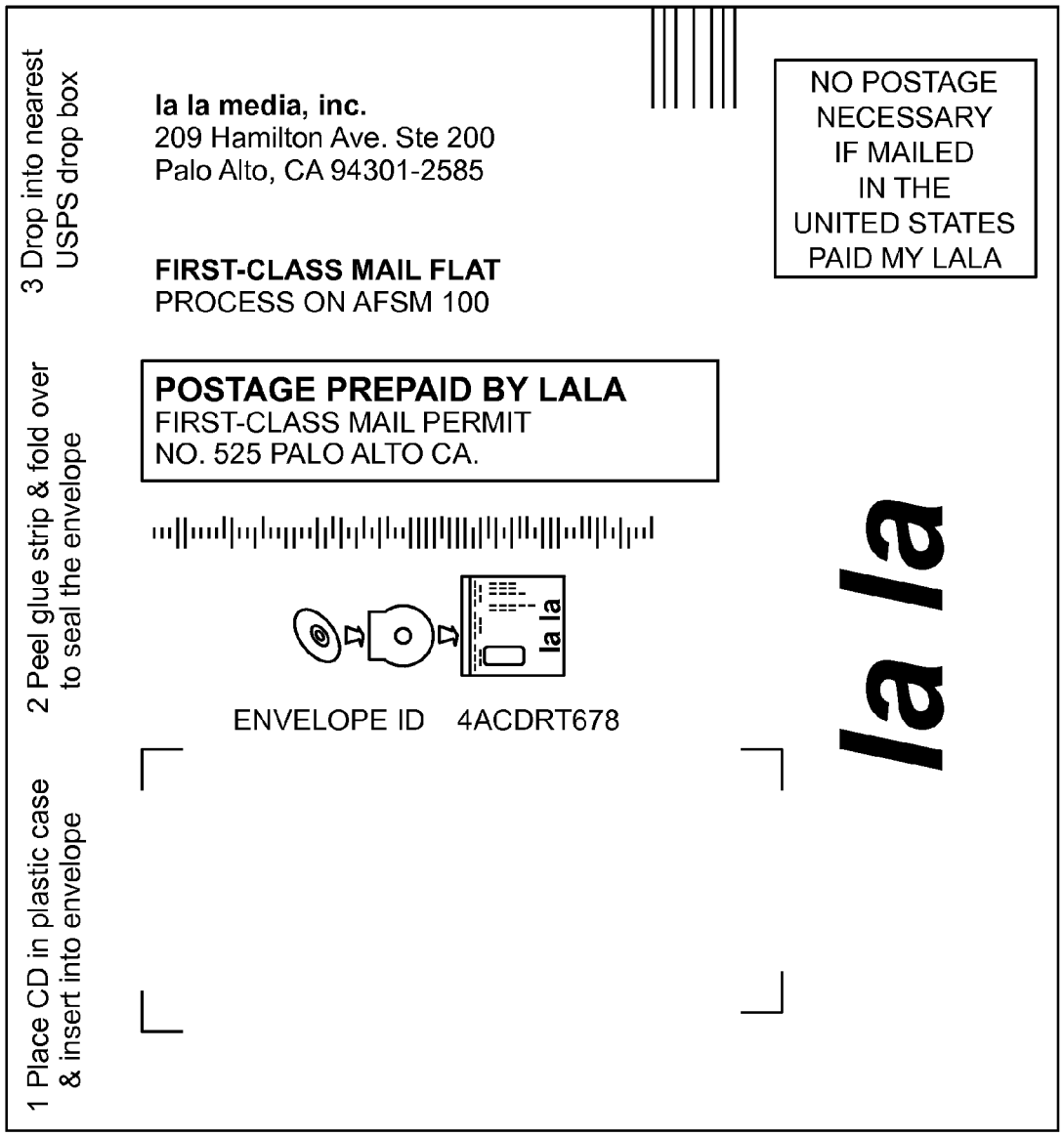
FIG. 39 shows an image of a front view of a sample envelope.

FIG. 37 shows a combination flowchart/entity relationship diagram related to the envelope supplying process. FIG. 38 shows a flowchart related to the envelope supplying process. FIG. 39 shows an image of a front view of a sample envelope.

One suitable plastic case for use in mailing CDs is a Clam Shell CD Case Model No. S-6765, commercially available from Uline®, Waukegan, Ill. However, any plastic case may be used.

Business logic for the envelope supplying process

The Administration Computer updates the envelope counts and plastic case counts in the Score Table (FIG. 9) every time a trade is initiated or confirmed for a member based on the following rules:

1. When a member agrees to ship a CD via trade, the member's envelope count is decreased by one.
2. When a member agrees to ship a CD via trade, the member's plastic case count is decreased by one.
3. When a member confirms receiving a CD via trade, the member's plastic count is increased by one.

The Administration Computer updates the envelope counts and plastic case counts in the Score Table (FIG. 9) every time a shipping or confirmed as follows:

1. The member's envelope count is increased by the number of envelopes in the SKU in the shipping order.
2. The member's plastic case count is increased by the number of plastic cases in the SKU in the shipping order.

The Administration Computer determines if a shipping order should be generated every time a member is part of trade based on the following rules:
1. If member does not have a valid address in the Address Table (FIG. 7), then the member cannot order any envelopes.
2. If member has a valid address in the Address Table (FIG. 7), but has never been shipped any envelopes, then the administration processor generates a shipping order for a SKU with 5 envelopes and 5 plastic cases.
3. If a member has 5 or less trades and the member envelope count is less than 2 and the member has a valid address in the Address Table (FIG. 7), the member is notified of the option to order additional envelopes. The member can order a SKU with 5 envelopes and 5 plastic cases.
4. If member has more than 5 trades and the member has less than 5 envelopes and member has a valid address in the Address Table (FIG. 7), then the member is notified of the option to order additional envelopes. The SKUs available for order are determined as follows:
    i. Members with 5 or more trades, can order the following SKUs:
        1. 5 envelopes, 0 plastic cases
        2. 10 envelopes, 0 plastic cases
    ii. Members with 15 or more trades, can also order the following SKUs:
        1. 20 envelopes, 0 plastic cases
    iii. Members with less than 5 plastic cases on hand, can also order the following SKUs:
        1. 5 envelopes, 5 plastic cases
        2. 10 envelopes, 10 plastic cases

VII. ADDITIONAL EMBODIMENTS OF THE PRESENT INVENTION

Embodiments of the present invention relate to a system and method for on-line searching of information. More particularly, embodiments of the present invention relate to a system and method for a community-based searching and related applications.

On-line search methodologies are well known. However, conventional search methodologies that use cached databases to conduct searches cannot take into consideration information added subsequent to caching, or any real-time information. In addition, convention search methodologies do not take into consideration multi-dimensional inputs that encompass information both provided directly from the user and relevant information from an on-line community to which the user is a member.

An example of an on-line community may include a membership to a community dedicated to the exchange of information about music, and the buying or trading of legally-purchased music. According to the Recording Industry Association of America (RIAA), nearly 30,000 album titles are released each year. With nearly 3 million titles available, large resellers generally only stock about a few thousand titles, or less than 1% of all available music. An on-line community may be formed to exchange information about music, and more specifically, to exchange legally-purchased CDs on fellow community members.

A novel on-line searching methodology for conducting searches based on real-time information, taking into consideration multi-dimensional inputs, and capable of returning multi-dimensional search results relevant to the multi-dimensional inputs.

Embodiments of the method for a community-based search are described in this detailed description of the invention. In this detailed description, for purposes of explanation, numerous specific details are set forth to provide a thorough understanding of embodiments of the present invention. One skilled in the art will appreciate, however, that embodiments of the present invention may be practiced without these specific details. Furthermore, one skilled in the art can readily appreciate that the specific sequences in which methods are presented and performed are illustrative and it is contemplated that the sequences can be varied and still remain within the spirit and scope of embodiments of the present invention.

The present invention provides a personalized search, in real-time, that takes into consideration multi-dimensional inputs, some of which are a user's personal preferences and recommendations, and some of which are based upon information of other members of an identified community with similar interests and/or background, and yielding not only search results as requested by the user, but also recommendations that are relevant to the user. The user has the option of identifying a relationship with any particular member in the community. The method then takes the relationship into consideration in conducting the search. The method of the present invention is able to search any database, bring all data into a search engine in real-time, and take into consideration multi-dimensional data feed, or multiple inputs, to produce multi-dimensional outputs. In one embodiment, the database may be created and maintained as part of the search engine. In another embodiment, existing information concerning the user is updated in real-time upon the completion of the search.

As an example, in an on-line community, members can trade-in CDs they have for CDs they want from other members. If a CD is not immediately available for trade, members can buy the CD new or as a digital download at retail prices. Accordingly, the multi-dimensional inputs may include user profile, which may include what CDs the user has to trade and what CDs the user wants, and profiles of other members in the community that are deemed relevant either by the user or the search engine. A user may indicate the relevance to any specific members of the community by indicating certain members as being "friends" or as sharing certain common interests. The search engine may also identify relevant members as part of the search by identifying implicit links, such as behavioral history and past communications. The profiles of these members are then taken into consideration. The search result is therefore tailored specific for the user.

The search engine may be implemented with clustering of fuzzy logic algorithms that are capable of isolate similarities and differences from the community in order to achieve a more personalized search. Depending upon the application, different weightings may be assigned to the various similarities and differences. In other words, the search results may be tailored by adjusting the weightings of different parameters. In addition, the search engine will also take into consideration any anomalies that are inconsistent with the norm. Such anomalies are either eliminated from the search or provided a reduced weighting during the search. Therefore, intentional manipulation of the search results is minimized and eliminated.

In operation, a general search is first performed based upon the general search parameters provided by the user, and then a second search may be conducted, considering the other multi-dimensional parameters, to produce a refined, personalized search result. Specifically, the present invention is directed to a search and recommendation platform. The platform is configured to gather and index data in real-time from a plurality of members to generate search results and recommendations of product or content custom tailored for the individual member. Along with content or product, the platform also makes recommendations of members of the platform that are associated with such product or content. The platform uses a number of inputs and behaviors to compute recommendations for its members, which may include lists of content or product owned or desired by the user members, frequency of use of such content and product, links, explicit and implicit, between individual platform members, levels of inventory and demand for the content and product available on the platform, product or content rating and reviews by members related or unrelated to a specific member, and physical geography.

The method also takes an user's list of desired content or product, their individual list of owned content or product, any known uses by the user of the content or product, and any other known inputs and behaviors for the user to generate either a unique recommendation of new product or content for the user based on comparisons to the plurality of members of the platform, or lists of recommended members whose lists of content or product owned, desired, or used are relevant to the user.

The method of the present invention also assigns a proper weighting to each member in the platform for the purpose of generating better recommendations for a user. The weighting of each member is unique to the user for whom the recommendations are generated and can also vary if the user has made a specific request for a content or product. The calculation of the weighting for members may be based on other members' likeness to the user based on comparisons of their lists of desired content or product, lists of owned content or product, and known uses of content or product, such as an overlap in the have list and want list in the on-line music community example. The weighting may also depend upon the similarities in members' explicit links to other members of the platform. In addition, the weighting may take into consideration a member's knowledge level of the requested content or product. Again in the example of the on-line music community, an artist would be assigned a heavier weighting than a novice.

The weighting may also depend on a member's overall influence as determined by the number of items in their lists of owned content or product that are desired by other members of the platform. Furthermore, the weighting may also take into consideration a member's ability to predict the demand or success of content or product as determined by the timing and number of items placed in the members' list of desired or owned, before such content or product is considered to be in high demand as measured by the number of members that include it in their list of desired content or product or by external market sales, revenue, or distribution data. Lastly, the weighting may be influenced by a member's ability to predict the success of content or product as determined by their use of content or product (e.g., listen to songs) before such content or product is considered to be in high demand as measured by the number of members that include it in their list of desired content or product or by external market sales, revenue, or distribution data. The foregoing examples are for illustrative purposes only. Otherwise factors may also be taken into consideration to influence the weightings of various factors to tailor to the specific applications of the search engine.

The platform of the present invention is also capable to compute member scores and indexes for recommendations of content or product in real-time based on changes to aggregate lists of content or product owned, desired, used, or any other known inputs or behavior by the plurality of members. Correspondingly, the method generates a sorted list of recommended content or product based on the total instances of product or content in the lists of content or product owned or desired by the members, the frequency of use of such content and product, and any other known inputs and behaviors with the proper weight assigned to each member. The weight assigned is unique to the user for whom the recommendations are generated.

The search engine also includes logic means that sorts recommendations based on the overall levels of inventory and demand based on the aggregate lists of content or product owned or desired by the entire plurality of members or a subset of such members. The logic means also filters or sorts an user's recommendations based on product already existing in the user's list of desired content or product or list of owned content or product. The logic means may also be programmed to intentionally introduce recommendations in a random process to increase exposure of content or product by its members;

Therefore, the system of the present invention captures the various members' 'have lists', defined as items owned, and 'want lists', defined as items desired, captures members frequency and timing of use of the content or product, allows members to find content or products and makes personalized recommendations of related content or product or members of the service, allows members to create explicit associations with other members (e.g., friends list, people to bookmark), and allows its members to browse and compare lists of content or product owned or desired between a member and one or more members in the service.

The system of the present invention is able to integrate the platform to an online service that enables commerce transactions (purchase, subscription, or barter) of the content or products and enables promotion and direct marketing of the content or product to the platform members. The service uses members' lists of desired or owned product to target specific members with varying promotions of content or product and uses member scores to target specific members with promotions of content or product for the purpose of predicting future demand for the product.

The system and method of the present invention allows for trading, or bartering, and keeps track of items that have been bartered and the value given up in the past. In addition, in the bartering or trading, actual money need not be involved as members may optionally choose to keep "credits" for the product traded and such credits may be used to purchase or exchange any desired product from other members in the community. The value of each bartered product is weighted to reflect factors such as past value received and demand. User profiles are also considered to further refine the weightings to optimize business variables.

Accordingly, the present invention provides a system and method for conducting barter transactions between members of a service without using explicit prices or values assigned to the items. Instead, the method utilizes a one for one barter system supported by a matching algorithm that uses as inputs the members' 'have lists', defined as items owned available for barter, and 'want lists', defined as items desired. The system and method include logic means that allows for 'many to many' barter transactions, where individuals may send one of their items to a member, while receiving a desired item from a different member. The system and method also include logic means for computing implicit values for have or want items based on actual or predicted demand for the items by the member community of the service, and for assigning values to the members of the community based on the implicit values of items they have bartered with other members.

In addition, the system and method include logic means for computing a 'risk' value for each member such that they are allowed to receive items from their want list from other members first having to give up an item they possess based on the probability that will give up an item of a certain value and/or category in the future. A logic means may also be included for prioritizing the list of members that are possible recipients of an item by examining member behaviors which may include but not limited to implicit values of items bartered, risk values of the members, stated preferences by the members, and implicit preferences computed by the platform. In addition, the system and method of the present invention also includes a logic means that utilizes levels available inventory and demand of the aggregate population to optimize barter transactions between members, and a logic means that weights the members' physical proximity when prioritizing member matches for barter transactions.

In the example of the on-line music community in which legally-purchased music is bartered or traded, the intellectual property rights attached to the music are exhausted after their initial sale. The doctrine of exhaustion allows an owner of a lawfully acquired CD to dispose of the possession of that copy without permission or payment of additional royalties to the copyright holder. As a result, artists were not compensated from the sale of used CDs.

The system and method of the present invention may optionally provide a system to compensate the original owners of intellectual property rights for legal trading of music or other protected works, under which the original owners would receive no compensation.

Accordingly, there is provided a method for distributing compensation directly or indirectly to the original authors, publishers, and any other entities that may benefits from the licensing, sale or use of the original copyrighted or protected content or product based on the resale, trading, or bartering of such copyrighted content or product. Such compensation may include, but are not limited, to royalties, fixed payments, marketing, or promotional agreements, and other forms of monetary or non-monetary compensation. In addition, such compensation may depend on the weighting assigned to factors such as popularity and demand. Any such trading or bartering is tracked by the system of the present invention.

Finally, the system and method of the present invention provides a user interface framework that enables multi-dimensional browsing of members of a platform and content or product associations for those members in the platform. The framework integrates with the platform to enable relationships between the dimensions displayed. For example, the content displayed serves as input to determine members displayed and vice versa. In addition, the framework enables true personalization of the browsing experience for the individual using the framework by integrating with the platform to generate unique content across each dimension based on characteristics of the individual using the framework.

The user interface may be based generally on AJAX (Asynchronous JavaScript And XML) programming, a Web development technique for creating interactive web applications. Small amounts of data are exchanged with the server behind the scenes to make the rendering of the web pages more robust, and increase the Web page's interactivity, speed, and usability.

The user interface framework includes a member browsing element capable of retrieving and displaying lists of members from an underlying platform based on numerous associations with a specific member or with a specific piece of content or product listed in the platform, relaying inputs to the underlying platform for varying the association criteria for retrieving lists of members from the underlying platform, navigating the list of members retrieved if they all do not fit in a single page, and selecting a specific member from the list. In addition, the framework includes a content or product browsing element capable of retrieving and displaying lists of content or product from an underlying platform that are associated with a specific member or with another specific piece of content or product listed in the platform, relaying inputs to the underlying platform for changing, filtering or sorting the list of content or product retrieved and displayed from the underlying platform, navigating the list of content or product retrieved if they all do not fit in a single page, and selecting a specific content or product from the list.

The present invention is also capable of simultaneously displaying the member browsing element and the content or product browsing element in a single page which is originally generated by selecting a specific member. The system uses the member browsing element to retrieve and display lists of members from the underlying platform that are associated with the specific member selected (e.g., friends of the member selected). The system also uses the content or product browsing element to retrieve and display lists of content or product associated in the underlying platform with the specific member selected, and contains user interface (UI) elements for changing the association criteria for retrieving the list of members displayed in the member browsing element. For example, the individual may request to view members explicitly linked to another member or view members that are implicitly considered as similar by the platform. The system further includes UI elements for changing, filtering, or sorting the list of content or product associated with the specific member that is retrieved and displayed. As part of the retrieval, the user interface passes unique values that identify the individual using the framework. In this manner, the platform can return a personalized list of content or product based on the individual enabling comparisons, recommendations, sorting, and other operations on the content or product listed using the individual's preferences in the platform.

The present invention provides a system for simultaneously displaying the member browsing element and the content or product browsing element in a single page generated by selecting a specific content or product item in the platform. The system uses the content or product browsing element to retrieve and display lists of content or product associated in the underlying platform with the specific content or product item selected. The system also uses the member browsing element to retrieve and display lists of members from the underlying platform that are associated with the specific content or product item selected. UI elements are incorporated for changing, filtering, or sorting the list of content or product associated. As part of the retrieval, the user interface passes unique values that identify the individual using the framework. In this manner, the platform can return a personalized list of content or product based on the individual; enabling comparisons, recommendations, sorting and other operations on the content or product listed using the individual's preferences in the platform.

In accordance with an embodiment of the present invention, instructions adapted to be executed by a processor to perform a method are stored on a computer-readable medium. The computer-readable medium can be a device that stores digital information. For example, a computer-readable medium includes a read-only memory (e.g., a Compact Disc-ROM ("CD-ROM") as is known in the art for storing software. The computer-readable medium can be accessed by a processor suitable for executing instructions adapted to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

To summarize, the following embodiments of the present invention are provided:

1. A platform configured to gather and index data in real-time from a plurality of members to generate search results and recommendations of product or content custom tailored for the individual member, the platform making recommendations of members of the platform that are associated with such product or content.

2. A method for taking an individual's list of desired content or product, their individual list of owned content or product, any known uses by the individual of the content or product, and any other known inputs and behaviors for the individual to generate a multi-dimensional output.

3. A method for distributing compensation to original authors, publishers, and any other entities that may benefits from the licensing, sale or use of the original copyrighted content or product based on the resale of such copyrighted content or product.

4. A method for conducting barter transactions between members of a service without using explicit prices or values assigned to the items, including a one for one barter system supported by a matching algorithm that uses as inputs the members' 'have lists', defined as items owned available for barter, and 'want lists', defined as items desired.

5. A user interface framework that enables multi-dimensional browsing of members of a platform and content or product associations for those members in the platform, wherein the framework integrates with the platform to enable relationships between the dimensions displayed and enables personalization of the browsing experience for the individual using the framework by integrating with the platform to generate unique content across each dimension based on characteristics of the individual using the framework.

VII. ADDITIONAL EMBODIMENTS AND CONCLUSION

Although the commercialized embodiment described above is designed for one-way trades of CDs with each trade receiving the same trading credit, alternative embodiments of the present invention may trade other types of articles (e.g., books, DVDs), or may allow for trading of different types of articles (e.g., a book for a CD), two-way trades, and trades where different amounts of credits are given for a trade, or any combinations or permutations of these trading features. The various priority schemes described above may also be used in combination with the alternative embodiments so as to compensate for any perceived unfairness or imbalance in trading activity among members.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A computer-implemented method of trading articles among a plurality of members who are registered in a common community, the method comprising:
   (a) providing a user interface that allows a member to:
      (i) enter articles that the member owns and is willing to trade, and
      (ii) enter articles that the member wants to own,
   (b) communicating items (i) and (ii) to and from an administration computer associated with the common community via an electronic network; and
   (c) the administration computer hosting the plurality of members and facilitating article trades among the members via the administration computer and the electronic network, the administration computer:
      (i) identifying matches between owned and wanted articles,
      (ii) associating each member of the plurality of members with a risk assessment score that is a function of a number of trades executed by the respective member and a ratio of good trades to total trades,
      (iii) associating each member of the plurality of members with a trading credit balance that reflects a difference between a number of articles that the member previously owned and traded to other members and a number of articles that were sent to the member by other members, the trading credit balance being used to generate a trading credit balance number for the member by weighting the trading credit balance based on the risk assessment score associated with the member, and
      (iv) using a priority algorithm to select one of at least two of the plurality of members who each entered the same article that they want to own to yield a receiving member who will receive the article, the priority algorithm configured for computing priority scores for each of the at least two members based on a plurality of factors, the plurality of factors comprising at least the total number of articles that the member has traded and the trading credit balance number, and selecting the receiving member based on a highest of the priority scores.

2. The method of claim 1 wherein each member has a mailing address, and the priority algorithm uses a distance between mailing addresses of members associated with the identified matches as one of the factors in the priority algorithm.

3. The method of claim 1 wherein the administration computer in step (c) further:
   (v) maintains records of the amount of time since each member last received an article, and the priority algorithm uses the amount of time as one of the factors in the priority algorithm to select the receiving member who will receive the article.

4. The method of claim 1 wherein each article has a supply/demand score which is a function of the supply of an article to the demand for an article, the administration computer further:
   (v) comparing a supply/demand score for each article that a member ships at the time that the member ships the article to an average supply/demand score for all articles at the time that the member ships the article to obtain a supply/demand score ratio, and (vi) calculating a running average of the supply/demand score ratio for each member, wherein the supply/demand score is used as one of the factors in the priority algorithm to select the receiving member.

5. The method of claim 1 wherein the article trades are one-way article trades.

6. The method of claim 1 wherein the articles include music recordings stored on a computer-readable medium.

7. The method of claim 1 wherein the articles are compact discs.

8. The method of claim 1 wherein the articles are all of the same type.

9. The method of claim 1, further comprising:
(d) crediting an amount from a trading credit balance associated with the trading member and deducting an amount from a trading credit balance associated with the receiving member.

10. The method of claim 1, wherein the priority algorithm prohibits members having a trading credit balance less than a predetermined value from being selected as the receiving member.

11. The method of claim 1, wherein the priority algorithm prohibits members having a predetermined number of trades initiated but not yet completed from being selected as the receiving member.

12. The method of claim 1, wherein each member is associated with a quality balance score and each of the articles is associated with a quality article score, the quality balance score being the sum of the articles previously sent by the member and with the quality article score greater than the quality article score of the article that the member currently wants to receive minus the sum of the articles previously received by the member and with the quality article score greater than the quality article score of the article that the member wants to receive, the quality article score being a function of the current demand for the article to the current supply of the article among the members, and wherein the priority algorithm uses at least the quality balance score as one of the factors in the priority algorithm.

13. The method of claim 1, wherein the user interface further allows a member to view articles that other members are willing to trade and view articles that other members want to own.

14. A system for facilitating the trading of articles among a plurality of members, the system comprising:
a processor;
a module configured to control the processor to provide a user interface that allows a member to:
(i) enter articles that the member owns and is willing to trade, and
(ii) enter articles that the member wants to own,
a module configured to control the processor to identify matches between owned and wanted articles,
a module configured to associate each member of the plurality of members with a risk assessment score that is a function of a number of trades executed by the respective member and a ratio of good trades to total trades,
a module configured to associate each member of the plurality of members with a trading credit balance that reflects a difference between a number of articles that the member previously owned and traded to other members and a number of articles that were sent to the member by other members, the trading credit balance being used to generate a trading credit balance number for the member by weighting the trading credit balance based on the risk assessment score associated with the member, and a module configured to control the processor to select a receiving member who will receive the article among at least two members who want the article that a trading member owns and is willing to trade, the selection based on a priority algorithm to prioritize the at least two members wanting the article, the priority algorithm configured for computing priority scores for each of the at least two members based on a plurality of factors, the plurality of factors comprising at least the total number of articles that the member has traded and the trading credit balance number, and selecting the receiving member based on a highest of the priority scores.

15. The system of claim 14, further comprising:
a module configured to control the processor to credit an amount to a trading credit balance associated with the trading member and deduct an amount from a trading credit balance associated with the receiving member.

16. The system of claim 14, wherein the priority algorithm prohibits members having a trading credit balance less than a predetermined value from being selected as the receiving member.

17. The system of claim 14, wherein the priority algorithm prohibits members having a predetermined number of trades initiated but not yet completed from being selected as the receiving member.

18. The system of claim 14, wherein each member is associated with a quality balance score and each of the articles is associated with a quality article score, the quality balance score being the sum of the articles previously sent by the member and with the quality article score greater than the quality article score of the article that the member currently wants to receive minus the sum of the articles previously received by the member and with the quality article score greater than the quality article score of the article that the member wants to receive, the quality article score being a function of the current demand for the article to the current supply of the article among the members, and wherein the priority algorithm uses at least the quality balance score as one of the factors in the priority algorithm.

19. The system of claim 14, wherein the user interface further allows a member to view articles that other members are willing to trade and view articles that other members want to own.

20. The system of claim 14, wherein each member has a mailing address, and the priority algorithm uses a distance between mailing addresses of identified matching members as one of the factors in the priority algorithm.

21. The system of claim 14, further comprising:
a module configured to control the processor to calculate the amount of time since a member last received an article, wherein the priority algorithm uses the calculated amount of time as one of the factors.

22. The system of claim 14, comprising:
a module configured to control the processor to calculate a supply a supply/demand score for each article, the supply/demand score being a function of the supply of an article to the demand for an article;
a module configured to control the processor to calculate a supply/demand score ratio for each member, the supply/demand score ratio being a function of the supply/demand score for each article that a member ships at the time that the member ships the article to an average supply/demand score for all articles at the time that the member ships; and
a module configured to control the processor to calculate a running average of the supply/demand score ratio for each member, wherein the supply/demand score is used as one of the factors in the priority algorithm.

23. The system of claim 14, wherein the article trades are one-way article trades.

24. A non-transitory computer-readable storage medium storing instructions which, when executed by a computing device, cause the computing device to facilitate the trading of articles among a plurality of members, the instructions comprising:
provide a user interface that allows a member to:
(i) enter articles that the member owns and is willing to trade, and
(ii) enter articles that the member wants to own,
identifying matches between owned and wanted articles,
associating each member of the plurality of members with a risk assessment score that is a function of a number of trades executed by the respective member and a ratio of good trades to total trades,
associating each member of the plurality of members with a trading credit balance that reflects a difference between a number of articles that the member previously owned and traded to other members and a number of articles that were sent to the member by other members, the trading credit balance being used to generate a trading credit balance number for the member by weighting the trading credit balance based on the risk assessment score associated with the member, and
selecting one among at least two members who want an article a trading member owns and is willing to trade to yield a receiving member, the selection using a priority algorithm to prioritize the at least two members wanting the article, the priority algorithm configured for computing priority scores for each of the at least two members based on a plurality of factors, the plurality of factors comprising at least the total number of articles that the member has traded and the trading credit balance number, and selecting the receiving member based on a highest of the priority scores.

25. The non-transitory computer-readable storage medium of claim 24, the instructions further comprising:
crediting an amount to a trading credit balance associated with the trading member and deducting an amount from a trading credit balance associated with the receiving member.

26. The non-transitory computer-readable storage medium of claim 24, members having a trading credit balance less than a predetermined value from being selected as the receiving member.

27. The non-transitory computer-readable storage medium of claim 24, wherein the priority algorithm prohibits members having a predetermined number of trades initiated but not yet completed from being selected as the receiving member.

28. The non-transitory computer-readable storage medium of claim 24, wherein each member is associated with a quality balance score and each of the articles is associated with a quality article score, the quality balance score being the sum of the articles previously sent by the member and with the quality article score greater than the quality article score of the article that the member currently wants to receive minus the sum of the articles previously received by the member and with the quality article score greater than the quality score of the article that the member wants to receive, the quality article score being a function of the current demand for the article to the current supply of the article among the members, and wherein the priority algorithm uses at least the quality balance score as one of the factors in the priority algorithm.

29. The non-transitory computer-readable storage medium of claim 24, wherein the user interface further allows a member to view articles that other members are willing to trade and view articles that other members want to own.

30. The non-transitory computer-readable storage medium of claim 24, wherein each member has a mailing address, and the priority algorithm uses a distance between mailing addresses of members associated with the identified matches as one of the factors in the priority algorithm.

31. The non-transitory computer-readable storage medium of claim 24, the instructions further comprising:
calculating the amount of time since a member last received an article, wherein the priority algorithm uses the calculated amount of time as one of the factors.

32. The non-transitory computer-readable storage medium of claim 24, the instructions further comprising:
calculating a supply a supply/demand score for each article, the supply/demand score being a function of the supply of an article to the demand for an article;
calculating a supply/demand score ratio for each member, the supply/demand score ratio being a function of the supply/demand score for each article that a member ships at the time that the member ships the article to an average supply/demand score for all articles at the time that the member ships; and
calculating a running average of the supply/demand score ratio for each member,
wherein the supply/demand score is used as one of the factors in the priority algorithm.

33. The non-transitory computer-readable storage medium of claim 24, wherein the article trades are one-way article trades.

* * * * *